United States Patent
Merchant et al.

(10) Patent No.: US 10,362,109 B2
(45) Date of Patent: Jul. 23, 2019

(54) CLOUD OPERATING SYSTEM AND METHOD

(71) Applicant: Task Performance Group, Inc., Arlington Heights, IL (US)

(72) Inventors: Mushtaq H. Merchant, Deer Park, IL (US); Fakher Halim, Addison, IL (US)

(73) Assignee: Task Performance Group, Inc., Arlington Heights, IL (US)

( * ) Notice: Subject to any disclaimer, the term of this patent is extended or adjusted under 35 U.S.C. 154(b) by 420 days.

(21) Appl. No.: 15/085,140

(22) Filed: Mar. 30, 2016

(65) Prior Publication Data

US 2017/0289236 A1 Oct. 5, 2017

(51) Int. Cl.
*H04L 29/08* (2006.01)

(52) U.S. Cl.
CPC .......... *H04L 67/1097* (2013.01); *H04L 67/10* (2013.01)

(58) Field of Classification Search
CPC ...... H04L 67/06; H04L 67/1097; H04L 67/32
See application file for complete search history.

(56) References Cited

U.S. PATENT DOCUMENTS

| | | | |
|---|---|---|---|
| 4,713,806 A | 12/1987 | Oberlander et al. | |
| 5,881,231 A * | 3/1999 | Takagi | H04L 29/06 370/235 |
| 6,006,194 A | 12/1999 | Merel | |
| 6,070,209 A | 5/2000 | Hausauer | |
| 6,157,963 A | 12/2000 | Courtright, II et al. | |
| 6,230,219 B1 | 5/2001 | Fields, Jr. et al. | |
| 6,249,802 B1 | 6/2001 | Richardson et al. | |
| 6,289,382 B1 * | 9/2001 | Bowman-Amuah | G06F 13/387 709/226 |
| 6,484,224 B1 | 11/2002 | Robins et al. | |
| 6,681,270 B1 | 1/2004 | Agarwala et al. | |
| 6,724,875 B1 | 4/2004 | Adams et al. | |
| 6,742,035 B1 | 5/2004 | Zayas et al. | |
| 6,769,052 B2 | 7/2004 | Chauvel et al. | |
| 6,976,135 B1 | 12/2005 | Talbot et al. | |
| 7,051,071 B2 * | 5/2006 | Stewart | G06Q 10/06 709/204 |

(Continued)

*Primary Examiner* — Blake J Rubin
(74) *Attorney, Agent, or Firm* — Hinshaw & Culbertson LLP

(57) ABSTRACT

A cloud operating system (COS) and a computer system and method using the cloud operating system to perform electronic data interchange transfers of documents, converted as needed to file formats usable by receiving entities. The COS is configured to operate on a plurality of machines including an external computer system hosting a single server component and a database system-wide critical state/counter tables, and one or more server clusters interacting with the server component and state/counter database. Each server cluster includes a gateway computer system including a gateway storage volume on which sending and receiving entities are provisioned, and a plurality of processing server instances, each configured, on a revolving basis, to request permission from the server component to access the gateway storage volume to receive a document from a sending entity, receive and convert the document, request permission to transfer the converted document back to the gateway, and transfer the converted document back to the gateway when permitted.

24 Claims, 20 Drawing Sheets

(56) References Cited

U.S. PATENT DOCUMENTS

| | | | |
|---|---|---|---|
| 7,133,868 B1 * | 11/2006 | Ruest | G06F 17/30893 |
| 7,181,017 B1 * | 2/2007 | Nagel | H04L 9/0825 |
| | | | 380/282 |
| 7,194,417 B1 * | 3/2007 | Jones | G06Q 10/02 |
| | | | 705/5 |
| 7,644,197 B1 | 1/2010 | Waldorf et al. | |
| 7,917,705 B2 | 3/2011 | Bamba et al. | |
| 7,930,416 B2 * | 4/2011 | Miller | G06F 17/30902 |
| | | | 705/26.1 |
| 8,131,844 B2 | 3/2012 | Moore et al. | |
| 8,214,842 B2 | 7/2012 | Jaquet et al. | |
| 8,239,662 B1 | 8/2012 | Nelson | |
| 8,285,573 B1 | 10/2012 | Ballaro et al. | |
| 8,307,362 B1 | 11/2012 | Gong et al. | |
| 8,341,268 B2 | 12/2012 | Wang et al. | |
| 8,412,890 B2 | 4/2013 | Bamba et al. | |
| 8,607,249 B2 | 12/2013 | Otenko | |
| 8,650,320 B1 * | 2/2014 | Merrick | H04L 69/18 |
| | | | 370/465 |
| 8,682,955 B1 | 3/2014 | Monden et al. | |
| 8,689,237 B2 | 4/2014 | Dice et al. | |
| 8,730,791 B2 | 5/2014 | Mann et al. | |
| 8,792,374 B1 | 7/2014 | Jain et al. | |
| 8,826,293 B2 | 9/2014 | Jaquet et al. | |
| 8,843,633 B2 | 9/2014 | Eriksson et al. | |
| 8,849,971 B2 | 9/2014 | Ferris | |
| 8,909,890 B2 | 12/2014 | Gill et al. | |
| 8,930,244 B2 | 1/2015 | Ballaro et al. | |
| 8,930,948 B2 | 1/2015 | Shanmuganathan et al. | |
| 8,959,482 B2 | 2/2015 | Bhogal et al. | |
| 8,989,017 B2 | 3/2015 | Naouri et al. | |
| 8,990,399 B2 | 3/2015 | Wang et al. | |
| 9,003,502 B2 | 4/2015 | Zhang et al. | |
| 9,038,080 B2 | 5/2015 | Venkataraman et al. | |
| 9,038,088 B2 | 5/2015 | Phull et al. | |
| 9,043,458 B2 | 5/2015 | Balaji et al. | |
| 9,043,784 B2 | 5/2015 | Dunning et al. | |
| 9,088,584 B2 | 7/2015 | Feng et al. | |
| 9,110,886 B2 | 8/2015 | Yamauchi et al. | |
| 9,122,685 B2 | 9/2015 | Akelbein et al. | |
| 9,130,969 B2 | 9/2015 | Umanesan | |
| 2002/0103943 A1 * | 8/2002 | Lo | H04L 29/06 |
| | | | 710/2 |
| 2002/0143847 A1 | 10/2002 | Smith | |
| 2002/0178099 A1 * | 11/2002 | Young | G06Q 40/06 |
| | | | 705/36 R |
| 2003/0014286 A1 * | 1/2003 | Cappellini | G06Q 10/02 |
| | | | 705/5 |
| 2003/0072263 A1 * | 4/2003 | Peterson | H04L 29/06 |
| | | | 370/235 |
| 2003/0233503 A1 | 12/2003 | Yang et al. | |
| 2005/0055306 A1 * | 3/2005 | Miller | G06Q 10/10 |
| | | | 705/37 |
| 2005/0081202 A1 | 4/2005 | Brokenshire et al. | |
| 2006/0059253 A1 * | 3/2006 | Goodman | G06Q 10/06 |
| | | | 709/223 |
| 2007/0226084 A1 * | 9/2007 | Cowles | G06Q 30/06 |
| | | | 705/26.62 |
| 2008/0025230 A1 * | 1/2008 | Patel | H04L 41/5022 |
| | | | 370/252 |
| 2008/0068217 A1 * | 3/2008 | Van Wyk | G01D 4/004 |
| | | | 340/870.11 |
| 2009/0089078 A1 * | 4/2009 | Bursey | H04W 4/70 |
| | | | 705/300 |
| 2009/0119416 A1 * | 5/2009 | Sirdevan | G06Q 10/06 |
| | | | 709/246 |
| 2010/0082358 A1 * | 4/2010 | Begue | G06Q 10/10 |
| | | | 705/311 |
| 2010/0083171 A1 * | 4/2010 | Begue | G06Q 30/06 |
| | | | 715/810 |
| 2010/0115046 A1 * | 5/2010 | Reddy Byreddy | G06Q 10/06 |
| | | | 709/208 |
| 2010/0317420 A1 * | 12/2010 | Hoffberg | G06Q 30/0207 |
| | | | 463/1 |
| 2011/0145580 A1 * | 6/2011 | Auradkar | H04L 63/0428 |
| | | | 713/170 |
| 2011/0231899 A1 | 9/2011 | Pulier et al. | |
| 2011/0296021 A1 * | 12/2011 | Dorai | G06F 9/5072 |
| | | | 709/226 |
| 2012/0116782 A1 * | 5/2012 | Punnoose | H04L 63/20 |
| | | | 705/1.1 |
| 2012/0176897 A1 * | 7/2012 | Lohmar | H04L 12/1877 |
| | | | 370/231 |
| 2012/0271765 A1 * | 10/2012 | Cervenka | G06Q 20/12 |
| | | | 705/44 |
| 2013/0007065 A1 * | 1/2013 | Grechanik | G06F 17/30908 |
| | | | 707/802 |
| 2013/0226798 A1 * | 8/2013 | Orttung | G06Q 20/027 |
| | | | 705/44 |
| 2013/0246257 A1 * | 9/2013 | Burke | G06Q 50/06 |
| | | | 705/40 |
| 2015/0006711 A1 * | 1/2015 | Schaad | H04L 67/1097 |
| | | | 709/224 |
| 2015/0039489 A1 | 2/2015 | Rotella et al. | |
| 2015/0039725 A1 * | 2/2015 | George | H04L 67/325 |
| | | | 709/219 |
| 2015/0049644 A1 * | 2/2015 | Lee | H04W 72/0446 |
| | | | 370/256 |
| 2015/0117274 A1 * | 4/2015 | Lu | H04L 1/1678 |
| | | | 370/280 |
| 2015/0163206 A1 | 6/2015 | McCarthy et al. | |
| 2015/0222705 A1 * | 8/2015 | Stephens | G06F 3/0611 |
| | | | 709/214 |
| 2015/0341874 A1 * | 11/2015 | Nguyen-Dang | H04W 52/0209 |
| | | | 370/350 |
| 2016/0062770 A1 * | 3/2016 | Venkumahanti | G06F 9/3885 |
| | | | 712/24 |
| 2016/0266962 A1 * | 9/2016 | Rajasekharan | G06F 11/0793 |
| 2016/0283270 A1 * | 9/2016 | Amaral | G06F 9/5027 |
| 2016/0337731 A1 * | 11/2016 | Graves | G02B 6/1225 |
| 2016/0359701 A1 * | 12/2016 | Pang | H04L 63/1425 |
| 2017/0006135 A1 * | 1/2017 | Siebel | H04L 67/02 |
| 2017/0264493 A1 * | 9/2017 | Cencini | H04L 41/044 |

* cited by examiner

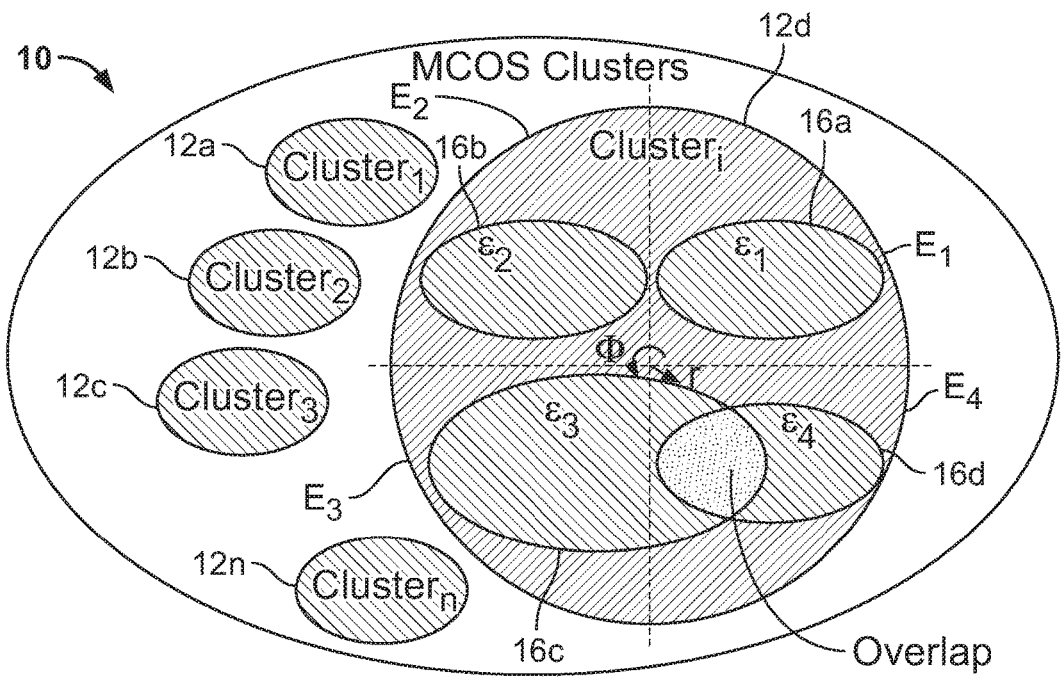
FIG. 3
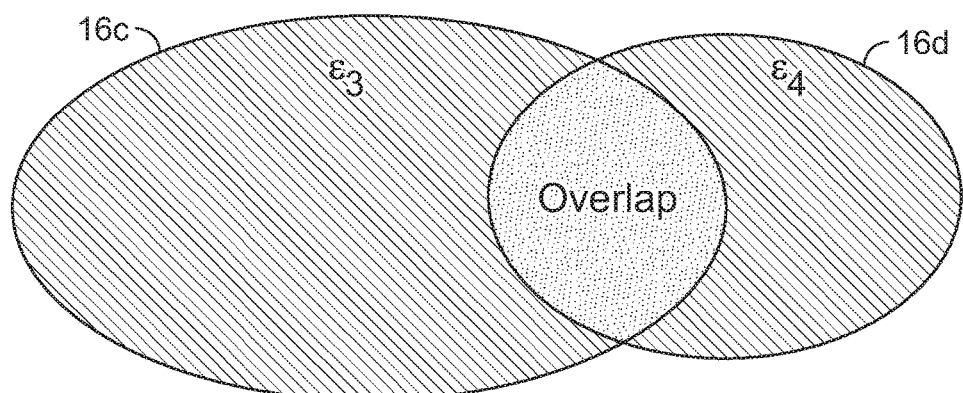
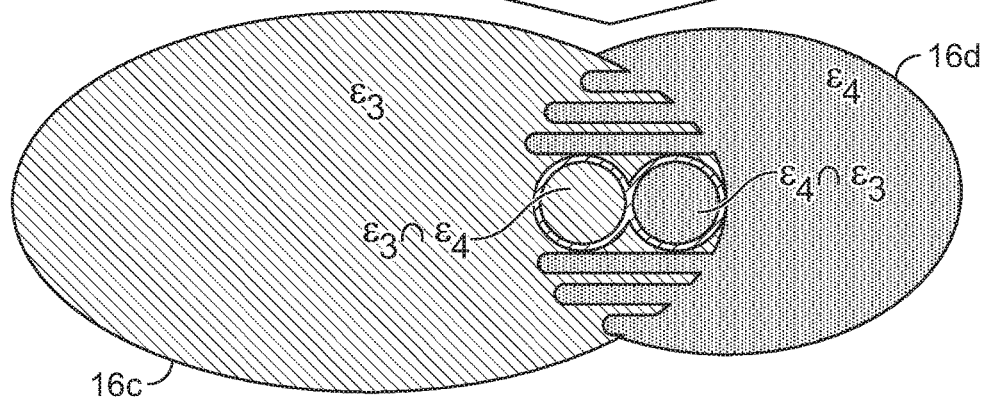
FIG. 4

MegaXML Cloud O/S ~22

☐

☐ All Instances Seek FTP Transfer Permissions, MCOS Algorithms Decides Which One Gets Permission and Dynamically Wire Instance with GW ☐ As Many GW Segments as there are B1 and B2 Sources and Destinations. Number of Segments (and hence the Parallelism/Agility) can Easily Increase by an Order of Magnitude ☐ All Trading Partners are Provisoned on all Instances of a Cluster ☐ MCOS Instance Agent does Transfers with ALL GW Partitions ☐ Critical Counters on Remote High Availability Azure SQL Service Accessible to all Cluster Instances ☐ All Critical Counters are Stored in Triplicated Azure SQL Tables, and VHD(Virtual Hard Disk) Drives Available for Cloning as BLOBs with Latest Info/Pipelines. No Need of Extra Backup Servers. Upon an Instance Failure, the Surviving Instances Continue Document Processing Service.

☐ Monitored/Maintained by Highly Available SPA Portal Accessible through Desktop Browsers, and Modern Mobile Devices. Need for Email Monitoring/RDP is Greatly Diminished

FIG. 16

CLOUD OPERATING SYSTEM AND METHOD

FIELD OF THE INVENTION

The present invention relates to a cloud operating system, a computer network for facilitating electronic data interchange (EDI), and methods of facilitating EDI.

BACKGROUND

In facilitating electronic data interchange (EDI) among a plurality of third party systems, many complex challenges exist. For example, when a single server cannot handle the I/O and processing operations associated with peak volume loading without a significant backlog, a cluster of server instances is typically employed, often working in parallel on processing and/or transferring to a gateway server different segments of the same individual file, which is then downloaded from the gateway server to a recipient system. However, in such cases, the failure of one processing server instance handling only a segment of a file can result in the entire transfer failing. Also, deploying a cluster of server instances can result in the resources of some instances remaining idle while others are overloaded, and/or slow periods in which fewer than all instances could handle the load without any loss in transfer speed or efficiency, such that the cost of maintaining superfluous instances is wasted.

Despite an EDI system having a cluster of n servers, there may be a huge surge in the business document traffic of customers provisioned on, for example, to an $i^{th}$ instance of the n servers. Imagine there are a total of k documents that need processing. If the average document processing time on a server instance is $t_{avg}$ (seconds), then it will take $k*t_{avg}$ (seconds) to clear the backlog, corresponding to a backlog clearing speed/frequency of $1/(k*t_{avg})$ (Hz). The presence of the n−1 extra instances, which do not take part in the processing of the backlogged k documents, would not improve the response time.

Existing EDI schemes have had limited success in exploiting services/resources that have now become available in cloud operating environments. For example, while exploiting a finer level of binary large object (BLOB) access can improve space-time parallelism, implementing this approach can require substantially modifying or rewriting a large amount of pre-cloud system code, with the potential for uncertainty in system behavior.

A need therefore exists for a system and method of facilitating EDI through a network of servers that minimizes latency, maximizes performance (e.g., speed and efficiency of file transfers), and minimizes the adverse impacts of one of its servers failing, throughout periods and events of higher and lower demand.

SUMMARY OF THE INVENTION

According to an aspect of the present invention, a cloud operating system is provided for facilitating electronic data interchange among a plurality of provisioned entities. In particular, the cloud operating system directs the scheduling and allocation of activities to be performed by separate physical machines within a server cluster, to provide more efficient operation by increasing utilization and reducing latency. The cloud operating system also monitors critical configuration and state data in a configuration/state database external to the server cluster, using this information (in part) to grant or deny file transfer access requests submitted by individual machines within a server cluster to a server component running on a computer system external to the cluster. The components and functionality of the cloud operating system are set forth in more detail in the following paragraphs.

The cloud operating system is configured to operate on a plurality of machines including a server cluster and an external computer system. More particularly, the server cluster on which the cloud operating system is configured to operate comprises a gateway computer system having a gateway storage volume and a plurality of processing server instances, to facilitate electronic data interchange among a plurality of provisioned entities interacting with the server cluster through the gateway computer system.

Within the foregoing context, the cloud operating system comprises programmed instructions stored in a storage medium readable by the external computer system, gateway computer system, and processing server instances. The programmed instructions include instructions for each processing server instance to initiate one or more scheduled file transfer procedures at predefined recurring file transfer start times assigned to the processing server instance, each recurring start time of each processing server instance differing from all recurring start times of all other processing server instances. Thus, for example, in a cluster having four processing server instances, a periodic clock cycle may be divided into four quadrants respectively assigned to each processing server instance, and the scheduled file transfer procedures of each server instance may be scheduled to initiate at the beginning of its assigned quadrant of the clock cycle. Each scheduled file transfer procedure includes the respective processing server instance sending a service call to a server component residing in the external computer system, the service call comprising a request for the processing server instance to access the gateway storage volume to transfer at least one file to or from the gateway storage volume.

Accordingly, the programmed instructions further include instructions for the server component to respond to the aforementioned service call by applying permission logic for granting or deferring the request, and to grant or defer the request in accordance with the permission logic. The permission logic includes at least a rule to defer the request if the requested file transfer would conflict with a file transfer to or from another processing server instance. Dynamic access granting instructions for the server component to dynamically grant access to the requesting processing server instance when the request is granted, the dynamic access granting instructions configured to provide any requesting processing server instance equal access to the gateway storage volume. "Equal access" means that no part of the gateway storage volume is permanently reserved for access by fewer than all of the processing server instances, and no part of the gateway storage volume is permanently inaccessible only to an incomplete subset of the processing server instances. Thus, "equal access" means that the same permission logic applies to requests from all processing server instances. However, the permission logic does not necessarily ignore changing circumstances. Thus, a request to access a particular part of the gateway storage volume by one requesting processing server instance may be granted, while the same request by a subsequently requesting processing server instance may be deferred, if the first instance is still using the part of the gateway storage volume (or scheduled to be using it) in a way that would conflict with granting the second request. The equal access that is granted to a requesting document processing server instance upon granting an access request may, for example, comprise access to an entire available (not in or scheduled to be in conflicting use) part of the storage volume or to any portion thereof, provided that the portion would be the same for any requesting instance.

Finally, the programmed instructions include instructions for the processing server instance to create a transfer session with the gateway computer system for the requested file transfer to be executed when the server component grants the request. Additionally, in a preferred embodiment, the programmed instructions include instructions for the processing server instance to transmit a completion signal or message to the server component upon completion of the transfer, thereby indicating to the server component that the portion of the gateway storage volume allocated to the transfer has become available.

In one embodiment of the cloud operating system, in the event that operations of a particular processing server instance continue past its respective time interval into an overlapping time subinterval comprising a portion of a subsequent time interval provisioned to another processing server instance, the dynamic access granting instructions are configured to apportion the storage volume in the overlapping time subinterval into orthogonal space-time segments assigned separately to operations of each overlapping processing server instance to reduce the probability of a collision.

In another embodiment of the cloud operating system, the programmed instructions further comprise instructions for the server component to, after receiving the file transfer request, record at least one context variable passed as an argument to the transfer request in a data table associated with a current counter value; and instructions for the server component, after determining that conditions for granting the request are satisfied, to call a stored procedure to assign a new current counter value to the data table.

In still another embodiment of the cloud operating system, the programmed instructions further comprise instructions for the recurring file transfer start times of each respective processing server instance to occur in a predetermined order during each of a plurality of recurring clock cycles.

In yet another embodiment of the cloud operating system, if the requested file transfer would collide in the gateway storage volume with a prior requested file transfer from another processing server instance, the programmed instructions further comprise instructions for the server component to host an environment in which the conflicting file transfers are handled one at a time.

In still another embodiment of the cloud operating system, the programmed instructions further comprise instructions for the transfer request from the requesting processing server instance to include priority information for the request.

In yet another embodiment of the cloud operating system, the programmed instructions further comprise instructions for the transfer request from the requesting processing server instance to include information specifying a current state of the requesting processing server instance.

In still another embodiment of the cloud operating system, the programmed instructions further comprise instructions for the transfer request from the requesting processing server instance to specify a maximum pre-transfer timeout time after which the requested transfer, if granted and not yet initiated, will be terminated.

In yet another embodiment, the cloud operating system further comprises a gateway service to be hosted by the gateway computer system of each cluster. The gateway service has two logical ends, including a $B_2$ end through which system customers interact with the cluster and a $B_1$ end through which trading partners of the system customers interact with the cluster. A specialized client component, configured to reside in each processing server instance, is configured to process file transfers to and from system customers operating legacy enterprise resource planning systems that require a plurality of files transferred through the $B_1$ end to be converted to or from a single concatenated byte stream.

According to another aspect of the present invention, a method of performing electronic data interchange among a plurality of provisioned entities is provided, the method using a cloud operating system substantially as described above, in any of its embodiments. According to the method, the gateway receives a file transfer comprising a document from a sending one of the provisioned entities and stores the document in the gateway storage volume. One of the processing server instances sends a service call to the server component comprising a request for the processing server instance to access the gateway storage volume to transfer the document from the gateway.

The server component responds to the service call by applying permission logic to the request to transfer the document from the gateway and granting the request based on a rule for granting the request. The server component dynamically grants said one of the processing server instances said equal access (defined above in the description of the operating system) to the gateway storage volume to transfer the document from the gateway storage volume, such as by returning a permission ID to said one of the processing server instances, which said one of the processing server instances may then pass to the gateway computer system, the gateway computer system in turn recognizing the permission ID to validate a transfer session created by said one of the processing server instances.

The one of the processing server instances then creates the transfer session with the gateway computer system, for executing the requested transfer of the document from the gateway storage volume. The requested transfer of the document from the gateway storage volume is then executed, and said one of the processing server instances, upon receiving the document, converts the document into a format for sending to a receiving one of said provisioned entities.

Said one of the processing server instances sends a service call to the server component comprising a request for the processing server instance to access the gateway storage volume to transfer the converted document to the gateway, and the server component applies said permission logic to the request to transfer the converted document to the gateway, and grants the request based on a rule for granting the request. The server component dynamically grants said one of the processing server instances said equal access to the gateway storage volume to transfer the converted document to the gateway, and said one of the processing server instances creates a transfer session with the gateway computer system for executing the requested transfer of the converted document to the gateway storage volume. The requested transfer of the converted document to the gateway storage volume is then executed, and finally, the gateway sends the converted document to said receiving one of said provisioned entities.

According to another aspect of the invention, a computer system for performing electronic data interchange among a plurality of provisioned entities is provided. The computer system uses a cloud operating system substantially as described above, in any of its embodiments. The computer system includes the external computer system hosting the server component and the server cluster comprising the gateway computer system having the gateway storage volume and the plurality of processing server instances. The gateway storage volume is provisioned to send and receive file transfers from each of the provisioned entities.

BRIEF DESCRIPTION OF THE DRAWINGS

FIG. 3 is a simplified Euler diagram of n server clusters of a system according to the invention, depicting for one of the clusters an overlap region in which two processing server instances of the cluster simultaneously access resources of a gateway server.

FIG. 4 is a schematic illustration of how a locking and arbitration mechanism of a cloud operating system according to the invention segments a region of overlapping activity of two server instances to allow parallel transfers and secure conflicting access.

FIG. 5b is an enlargement of a risky time period depicted in FIG. 5a.

FIG. 16 is a table contrasting a cloud operating system according to the invention with legacy server systems.

DETAILED DESCRIPTION OF THE INVENTION

With reference to the accompanying drawing figures, a cloud operating system and EDI method according to the invention will now be described in detail. The illustrated embodiments are described as variations of a cloud operating system for controlling a MegaXML® platform (a service-oriented architecture-compliant document interchange and data storage platform comprising a core transformation engine, hereinafter "MegaXML® engine", conforming to multiple syntax standards, provided by Task Performance Group, Inc. for performing a document interchange service, hereinafter "MegaXML® document interchange service", in a cloud computing environment, hereinafter "the MegaXML® cloud"). For ease of description and to provide a rich context for understanding aspects of the invention, the terms "MegaXML" and "MCOS" (MegaXML Cloud Operating System) are sometimes used herein to refer to a cloud operating system of the invention and its components or related entities (e.g., "MegaXML® document interchange service customers" $CU_1 \ldots CU_m$, "MCOS client agents"/"client components $CC_1 \ldots CC_n$", "MCOS server"/"MCOS central server"). However, the use of these terms is not intended to be limiting; rather, the scope of the invention extends to operating systems configured to support any applicable EDI and data storage platform.

From the following description, it will be appreciated that the cloud operating system of the present invention permits every instance of an EDI document processing server cluster to share a document processing load, without the risk of a single instance failure disproportionately impacting system performance, and without the need to hardwire or otherwise unequally restrict any instance's access to a sub-segment of an available storage volume of a gateway (GW) server with which the processing servers interact. In addition, the invention permits the use of NTFS (Microsoft's "New Technology File System") based virtual hard disk (VHD) drivers, allowing pre-cloud code on existing EDI computer networks to be ported into the cloud operating system of the invention, saving significant time and effort of rewriting or modifying the pre-cloud code.

Figure 1:
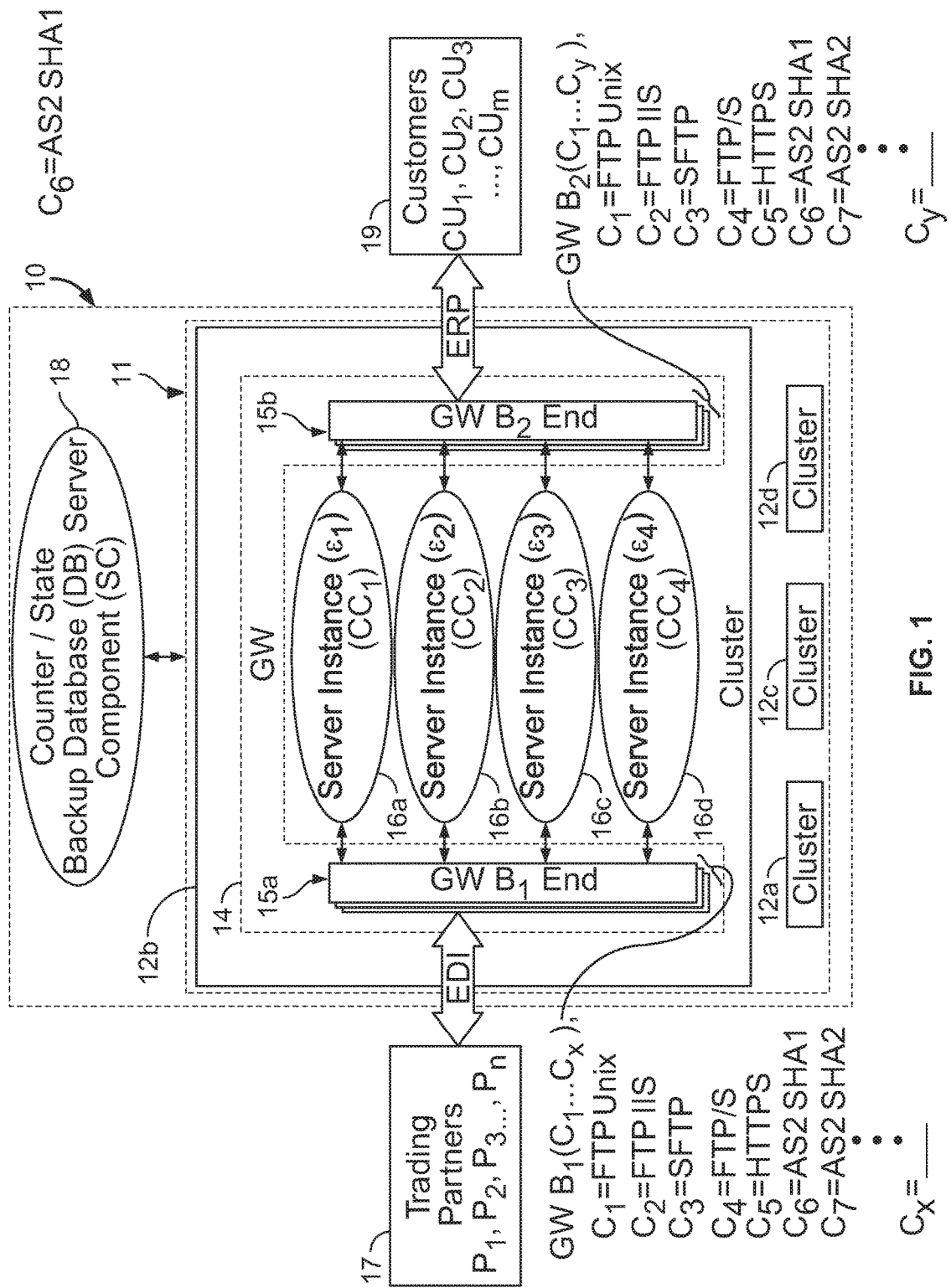
FIG. 1 is a schematic illustration of an electronic data interchange computer network according to an aspect of the invention.
Figure 9:
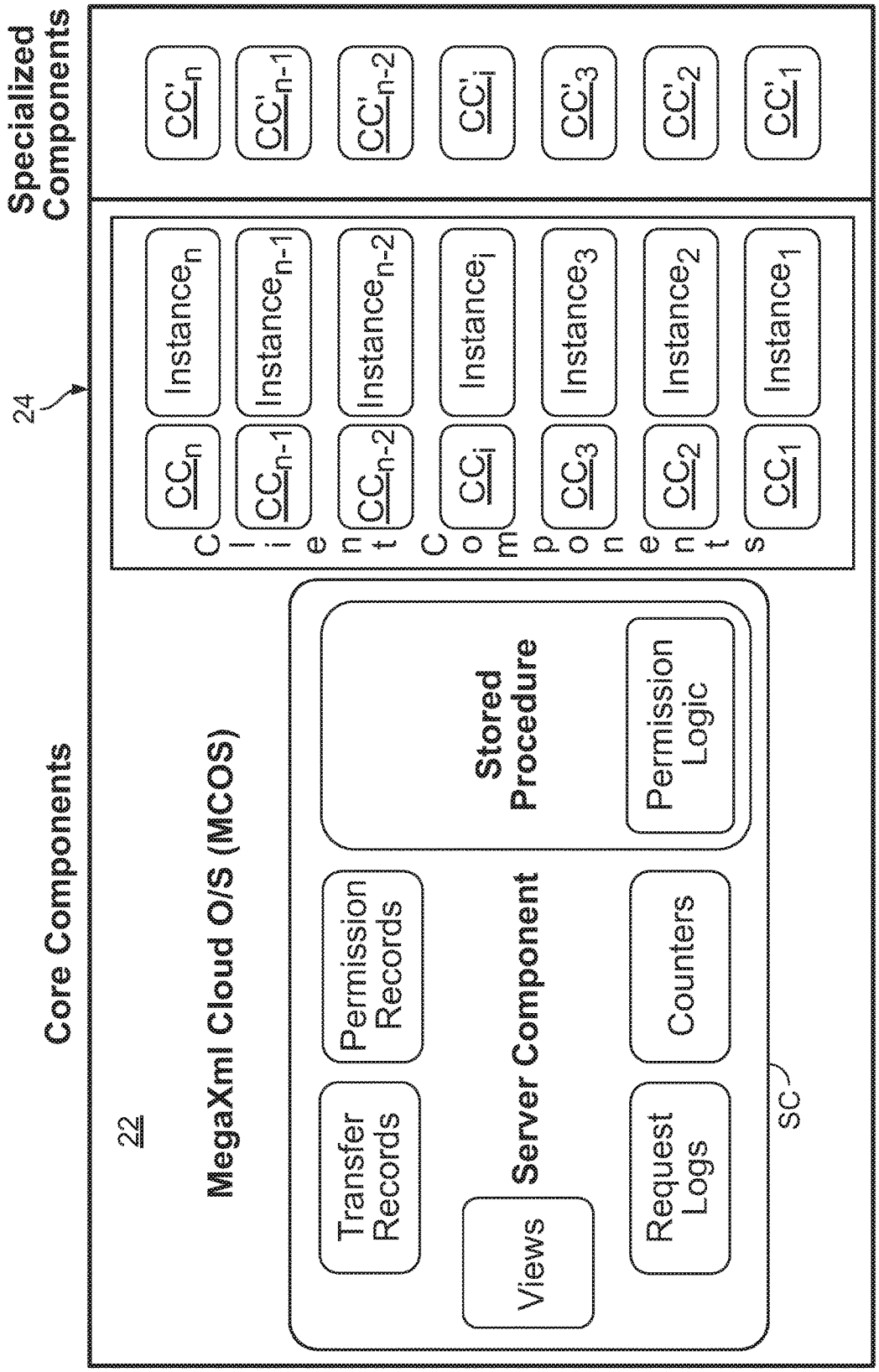
FIG. 9 is a schematic illustration of the core components of a cloud operating system according to the invention.

Turning to FIG. 1, the high-level architecture of an EDI computer network 10 running a cloud operating system according to the invention is depicted schematically. Network 10 is configured to support EDI between an arbitrary number of n trading partners 17, denoted as trading partners $P_1 \ldots P_n$ and an arbitrary number of m MegaXML® document interchange service customers 19, denoted $CU_1 \ldots CU_m$. Network 10 includes a cluster group 11 comprising a plurality of server clusters 12a, 12b, 12c, and 12d (network 10 may include more or fewer than four clusters within the scope of the invention), of which only cluster 12b is broken down into further details, for ease of illustration. For purposes of illustration, trading partners $P_1$, $P_2$, $P_3 \ldots, P_n$, are provisioned on cluster 12b, and other trading partners not shown may be provisioned on other clusters 12a, 12c, 12d of network 10. Cluster 12b includes a gateway system 14, which may comprise one or more physical servers, and processing server instances 16a, 16b, 16c, and 16d (which in particular embodiments may be more or fewer than four), also termed "instance$_i$," in FIGS. 2 and 9, each being a single physical server running the MCOS processing logic of respective instance engines $\varepsilon_1$-$\varepsilon_4$ and a respective MCOS software client component $CC_1$-$CC_4$.

Each processing server instance 16a-16d has equivalent access to each of two logically separate gateway ends 15a, 15b of gateway system 14, which are instances of ends of a gateway GW generically referred to herein as the $B_1$ end of a gateway GW, through which trading partners $P_1 \ldots P_n$ of MegaXML® document interchange service customers $CU_1 \ldots CU_m$ interact with a cluster; and the $B_2$ end of a gateway, through which MegaXML® document interchange service customers $CU_1 \ldots CU_m$ interact with a cluster. Gateway ends 15a, 15b may physically reside in the same server or in different servers. One advantage of gateway ends 15a, 15b residing in different physical servers denoted GW $B_1$, GW $B_2$, and/or each gateway end 15a, 15b comprising a plurality of physical servers designated as gateway instances GW $B_1(C_1 \ldots C_x)$; GW $B_2(C_1 \ldots C_y)$, is the ability to accommodate different communication protocols $\{C_1 \ldots C_x\}$, $\{C_1 \ldots C_y\}$ required by MegaXML® document interchange service customers and their trading partners, which may include $C_1$=FTP Unix, $C_2$=FTP IIS, $C_3$=SFTP, $C_4$=FTP/S, $C_5$=HTTPS, $C_6$=AS2 SHA1, $C_7$=AS2 SHA2, to name a few.

A single server component SC (termed an "MCOS server" in a commercial embodiment) provides permission for processing instances of all clusters of cluster group 11 to access their respective gateways, including, for example, permission for each processing instance 16a-16d of cluster 12b to access each gateway end 15a, 15b. Physical connection of processing instances to clusters is preferably facilitated through a high throughput connection, such as a high-speed Microsoft® Azure® virtual network. Server component SC resides in an external computer system 18 that is physically external to cluster group 11. External computer system 18 may comprise, for example, a single server or a plurality of networked servers. Server component SC includes storage containing permission records, transfer records, user interface views of MCOS activity, request logs, counters, and stored procedure, the stored procedure including permission logic for granting or deferring permission for processing servers of a cluster to access their respective gateway.

Critical cluster-wide state and configuration data tables are also preferably stored in a database DB residing in external computer system 18, where database DB may be an Azure® SQL database. Whenever a client component $CC_x$ of an instance 16a-16d sends a gateway access request to server component SC, the request passes one or more state data parameters of the requesting instance, which are updated in or aggregated to database DB. External storage of database DB facilitates seamless continued operation in the event of the failure of a single instance 16a-16d as well as a quick recovery in the event of a catastrophic failure of cluster 12b. In particular, when a new processing instance 16a-16d (or other new processing instance not shown) comes online, it pulls configuration information from database DB once and stores it within its own memory before processing documents. In case one of processing instances 16a-16d fails in the middle of processing a document, a pipeline corresponding to the partially processed document would be invalidated, and any surviving instance would reprocess the document through a freshly provisioned pipeline. Similarly, in the unlikely event that an entire cluster 12b should catastrophically fail, despite measures to avoid this such as distributing document processing instances 16a-16d and gateway instances GW $B_1$, GW $B_2$ at different geolocations, server component SC would detect the failure and seamlessly provision the transfer profiles of any affected customers and trading partners on a surviving cluster.

Figure 2:
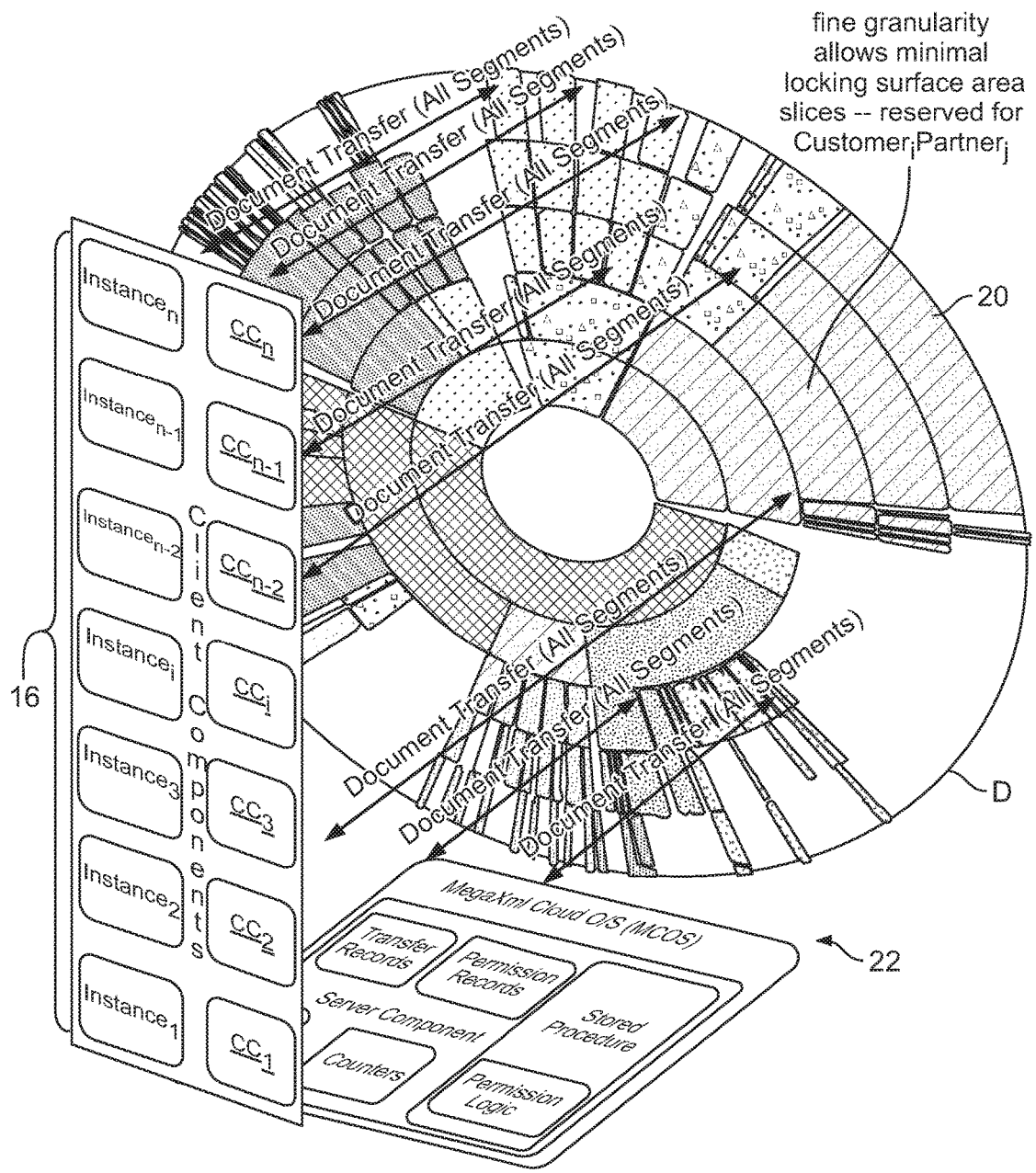
FIG. 2 is a schematic illustration of server instance engines running a cloud operating system according to the invention to manage concurrent document transfers of n instances.

Advantageously, the cloud operating system of the invention permits every instance 16a-16d to share the document processing load of cluster 12b, with just one configuration definition for segments of gateway system 14, and one set of tables to define centralized/cluster-wide configuration, process pipelines, and transaction outcomes. This advantage is achieved in part by partitioning the resources of gateway system 14 (which resources may be referred to as "gateway GW") with a fine granularity into instance independent, spatially orthogonal 2-D segments 20 of the storage volume, as shown in FIG. 2, a conceptual illustration of how a cloud operating system 22 allocates the storage volume D of gateway system 14 to profiles processed by n server instances 16. The cumulative activity of each instance 16 accessing storage volume D is orthogonal to the activity of other instances 16 only in time. The inevitable possibility of the activity of one instance lingering beyond its scheduled time segment can be managed by leveraging the spatial orthogonality of segments 20 to permit simultaneous access to different subsets (profiles) of segments 20 by multiple instance engines and/or dynamically overriding a schedule to defer activities of a waiting instance until the activities of a lingering instance are concluded. Storage volume D is split into a large number of orthogonal segments 20, which may desirably approach a theoretical maximum number of segments, and the segmentation information is configured in all client components or server instances 16 to safely achieve maximum simultaneous transfers without risking a "collision," i.e., file corruption caused by wrongly granting conflicting permissions to more than one instance, such that they both simultaneously attempt to write to the same space within the storage volume of gateway system 14.

Turning to FIGS. 3 and 4, simplified Euler diagrams are depicted to illustrate how MCOS manages an overlap region in space-time where activities of instance engines $\varepsilon_3$ and $\varepsilon_4$ are both taking place. The circle denoted Cluster$_i$ in FIG. 3 is actually a disk in polar (r, $\phi$) coordinates where each angle $\phi$ represents an instant in time, and separate physical locations within a storage volume are represented by distinct values of r, such that the entire storage volume at a given instant $\phi$ is represented by a line segment in the r-axis.

The 2-D instance-specific segmentation scheme clips the maximum cluster throughputs to be just as high as that of one instance. Using cloud operating system 22 allows emulation of a logically multidimensional time-multiplexed document transfer orthogonality that can be extracted from a (or implemented on a) conventional 2-D physical space, even while using a conventional NTFS VHD persistence layer. Each degree of freedom obtained by this emulation by cloud operating system 22 creates a tremendous growth opportunity potential while still providing the security/stability offered by statically allocated persistence angled pies per instance. For example, the illustrated cluster of four-instances 16a-16d illustrated in FIG. 3 gives four orthogonal 90° pies $E_1$, $E_2$, $E_3$, $E_4$ out of a 360° polar "surface" area representing time-space segmentation of a storage volume of gateway system 14. This emulation by cloud operating system 22 injects additional logical axes of time-space orthogonality, the way a physical 2-D holographic film projects a 3-D hologram creating voxels from pixels.

As noted above, if the $i^{th}$ instance of an n-server cluster experiences a surge in demand from customers exclusively provisioned on the $i^{th}$ instance, and the average document processing time for the $i^{th}$ instance is $t_{avg}$ seconds, then it would take $k*t_{avg}$ (seconds) to clear the backlog, corresponding to a backlog clearing speed/frequency of $1/(k*t_{avg})$ (Hz), regardless of the presence of n−1 extra instances incapable of sharing the burden. In contrast, in an n-server cluster according to the invention, all customers are provisioned on all servers, and n−1 additional instances easily help reduce the response time, down to a theoretical minimum limit of $k*t_{avg}/n$.

Implementation of this theoretical and high level of performance is anything but trivial, as collision probability increases exponentially with rise in file access simultaneity. Equation (1) below is Poisson's distribution function, which defines the probability of exactly k events occurring in a unit of time given an average of λ events per unit of time, is particularly relevant to the probability of a collision when multiple instance engines are simultaneously accessing a storage volume of a gateway server:

$$f(k,\lambda) = \lambda^k / k! e^\lambda = e^{-\lambda} * \lambda^k / k! \tag{1}$$

Collision avoidance challenges in a cloud operating system and their probabilities will now be discussed. Any cluster running cloud operating system 22 can have an arbitrary n number of engines. Preferably, separate clusters are orthogonal to one another, that is, completely disjoint, such that their collision probability is zero. In the Euler diagram depicted in FIG. 3, five of a total of n clusters are shown as clusters 12a, 12b, 12c, 12d, and 12n. Clusters$_{1-3}$ (12a-12c) are completely independent of events that are happening in cluster$_i$ (12d) or cluster$_n$ (12n). Therefore, the internal details of those clusters are omitted. In accordance with the invention, network 10 may have any number of clusters. Likewise, cluster 12d is shown with events from four instance engines, although any given cluster may have more or fewer engines. All four engines are shown with schedules kicking off in four quadrants with a fixed angular width allocated as π/2 with an issue with processing server instance 16c/instance engine $\varepsilon_3$ that could not complete its job within its allocated time in the third quadrant ($\pi<\phi<3\pi/2$) and hence stretching the ellipse corresponding to its scheduled events into the fourth quadrant (i.e., $3\pi/2<\phi<2\pi$) by almost π/6 of the time/space reserved for instance engine $\varepsilon_4$.

This can cause potential collisions in an overlap region represented as the intersection of instance engines $\varepsilon_3$, $\varepsilon_4$ in FIGS. 3 and 4. The following section focuses on general equations that are used to calculate the probability of such occurrences, and the next section works on solutions offered by cloud operating system 22 to eliminate all risks. Since it is a function of so many variables, just a single diagram shows a geometric solution that is implemented by cloud operating system 22. FIG. 4 is an enlarged view of the area of interest cited in FIG. 3 and displays the solution in an elementary form of an Euler diagram (omitting overlays of polar coordinates that are previously articulated). A pure polar segment would be a pie, but to blend Euler space conventions, the shapes are some variant of ellipses with extended round rectangles. Therefore, as shown in FIG. 3, clusters are 2-D areas, fairly accurately represented by ellipses in Cartesian coordinates.

However, when it is desired to focus on internals of a single cluster, and to represent collisions in space-time, polar coordinate disks are employed with space formally confined to the r axis (but informally displayed as an ellipse with a finite area). The profile configurations (and the total number of profile configurations) are identical on every instance. Spatially (ignoring time), they are 100% overlapping as they all go towards the same physical endpoint set on gateway machines to do document transfers. However, it is because of cloud operating system 22 that they are scheduled to occur in a coordinate way so that at any given point their probability of downloading the same file is minimal (but not zero). As noted above, for purposes of graphical representation, time is proportional to φ in a polar coordinate system whose origin is concentric to the center of cluster 12d.

Assuming a scheduling event of cloud operating system 22 fires every engine in a way that it steps π/2 radians counterclockwise at state change, and only one engine will begin accessing gateway system 14 at a time; providing a large enough dead zone (where no instance is expected to be downloading) as a buffer interspacing the four quadrants should reduce the probability of collisions to approximately zero by ensuring that any excess time spent by a scheduled instance will run only into the dead zone, and not into the next quadrant allocated to another instance. As a practical matter, however, the maximum download time required by any instance cannot be predicted with 100% certainty in all cases, as gateway load may increase unexpectedly, and threads can get "sticky" with network I/O congestions (remain lingering until they are timed out). Thus, if too many large files appear in the turn of instance engine $\varepsilon_3$, connections are interrupted, and/or transfers get stuck because of many end point issues/timeouts, an overlap would occur. In the absence of any coordinating mechanism, instance engine $\varepsilon_4$ would kick off its schedule while instance engine $\varepsilon_3$ is still in the middle of troubled transfers. Instead of neatly stepping between four temporal quadrants/time windows $\{E_1, E_2, E_3, E_4\}$, each corresponding to a single state, the 2Ω periodic travel may traverse through five states, four corresponding to the activity of an instance engine $\varepsilon_1$-$\varepsilon_4$ in its assigned quadrant, and a fifth corresponding to overlapping activity of instance engine $\varepsilon_3$ with that of instance engine $\varepsilon_4$ in the quadrant assigned to instance engine $\varepsilon_4$, i.e., $\{\varepsilon_1, \varepsilon_2, \varepsilon_3, \varepsilon_3 \cap \varepsilon_4, \varepsilon_4\}$.

To analyze the problem at $\varepsilon_3 \cap \varepsilon_4$ assume an event A for $\varepsilon_4$ and B for $\varepsilon_3$. Note that event B has already occurred at $\phi>\pi$, and now it is the probability of event A (while B is still on) that is of interest.

If a sample space is denoted Ω, then $B \subseteq \Omega$ (B is a subset of Ω). Consider an elementary event $\{\omega\}$ in B. Since $B \subseteq \Omega$, the ω as an element of event B would have a probability scaled up (say by a factor of α), the new distribution will satisfy:

$$\omega \in B: P(\omega|B)=\alpha*P(\omega) \qquad (2)$$

$$\omega \notin B: P(\omega|B)=0 \qquad (3)$$

$$\Sigma_{\omega \in B} P(\omega|B)=1 \qquad (4)$$

Replacing P(ω|B) of equation (4) by αP(ω) from equation (2) will give the LHS(Left Hand Side)=$\Sigma_{\omega \in B}\alpha P(\omega)$= $\alpha\Sigma_{\omega \in B}P(\omega)$=αP(B) which is equal to 1. Therefore, α=1/P(B).

Substituting 1/P(B) into equation (2) for α gives $$\omega \in B: P(\omega|B)=P(\omega)/P(B) \qquad (5)$$

The above equation thus defines the probability of element ω given event B. Let us now eliminate ω, and return to the overlap area of $\varepsilon_3 \cap \varepsilon_4$ events or (A∩B) to be addressed by cloud operating system 22. Note that event B($\varepsilon_3$) had already happened and we want to know the conditional probability of A($\varepsilon_4$) given that B has already occurred, denoted P(A|B).

$$P(A|B)=\Sigma\omega \in A \cap B\ P(\omega|B)=\Sigma\omega \in A \cap B\ P(\omega)/P(B) \text{(from equation(5))} => P(A|B)=P(A \cap B)/P(B) \qquad (6)$$

Substituting server instance activity events back into equation (6), we obtain $$P(\varepsilon_4|\varepsilon_3)=P(\varepsilon_3 \cap \varepsilon_4)/P(\varepsilon_3) \qquad (7)$$

For cloud operating system 22, equation (7) is critical. It is a special equation with a limited scope for $\varepsilon_3$ and $\varepsilon_4$ conflicts as displayed in the Euler diagram of FIG. 3. In concrete terms, equation (7) states that the probability of occurrence of instance engine $\varepsilon_4$ firing its scheduled event while $\varepsilon_3$ is still not done with its transfer magnifies the overlapping probability P($\varepsilon_3 \cap \varepsilon_4$) by a factor of 1/P($\varepsilon_3$). This is consistent with Kolmogorov's equation (5) for conditional probability. For large clusters managed by cloud operating system 22, this may easily be magnified beyond an order of magnitude, considering so many factors can occur affecting a smooth document transfer. Equations (3) and (4) are among the inputs to a mathematical model that simulates numerically the probability of a collision under different environments. In addition, the model also factors in the following parameters of the potentially colliding transfers to get a more realistic estimate:

Transfer endpoint, i.e., $B_1$ or $B_2$ end of gateway
Transfer direction, i.e., upload or download
Transfer profile of a given MegaXML® document interchange service customer and its trading partner, including attributes such as the following:
  Typical day(s) of the week/time period(s) of transfers between these two businesses (e.g. early A.M. hours, late night, weekends/holidays etc.)
  Monthly cycles for invoices etc.
  Seasonal load For example, cloud operating system 22 may measure an average load of 20 files downloaded between 7:00 and 7:10 A.M. Monday morning for EDI between a customer XYZ and its trading partner ABC.

In the previous paragraphs, it was noted that according to equation (5), the overlapping region can significantly degrade the performance, and cause a large number of conflicts during document transfers. To overcome this challenge, two levels of improvement are implemented by cloud operating system 22.

As the first level of improvement, as shown in FIG. 4, the non-conflicting transfers are achieved by splitting the overlap region in multiple profiles (six of them are shown as combs protruding out of $\varepsilon_4$ into $\varepsilon_3$). Imagine we have fifty profiles, and both instance engines $\varepsilon_3$ and $\varepsilon_4$ use all of them. However, as shown in the above diagram, $\varepsilon_3$ was not done with all 50 of them (imagine it was doing transfers for 40th through 50th profiles when it just crossed the third quadrant when the $\varepsilon_4$ scheduler kicked off). Since both scheduler events are identical, instance engine $\varepsilon_4$ would begin processing profiles 1-39 while $\varepsilon_3$ was still lingering on profiles 40-50. The stippled $\varepsilon_4$ combs protruding into the forward diagonal hatched $\varepsilon_3$ area depicts those events.

As a second level of improvement, represented by the backward diagonal hatched figure eight respectively surrounding a circular stippled $\varepsilon_4 \cap \varepsilon_3$ region in the overlap area and a circular forward diagonal hatched $\varepsilon_3 \cap \varepsilon_4$ region in the overlap area, an MCOS locking mechanism secures conflicting overlapping transfers as described below. Further details are given in a timing diagram discussed below (FIGS. 5a-5b).

In a rare occurrence, having a small but finite probability (see equation (3)), instance engine $\varepsilon_3$ may still be in the middle of handling its $45^{th}$ transfer, when instance engine $\varepsilon_4$ has just finished its $44^{th}$ transfer, and therefore attempts to begin downloading the $45^{th}$; although instance engine $\varepsilon_3$ is still not done with its processing. The fabric of cloud operating system 22 guards against all such risky attempts and hosts an environment where these risky ($\varepsilon_3 \cap \varepsilon_4$) situations, in which instance engines $\varepsilon_3$ and $\varepsilon_4$ are attempting to access the same gateway segment(s) 20 at the same time, are securely handled—one at a time. This locking/arbitration mechanism was designed to leverage inherent orthogonality in file set affinity of modern architectures, while still not compromising the integrity of legacy concatenation needs of customers $CU_i$ or their trading partners $P_i$ for non-unique file name situations, which may be handled at either the $B_1$ end or the $B_2$ end of gateway GW.

In addition to the potential for overlapping instance activity, non-deterministic cloud behavior with respect to the resiliency of an Azure® SQL connection (or lack thereof) adds further complexity, which is addressed by retry logic. For instance, if an Azure® SQL service running on external computer system 18 fails to reply to MCOS requests because it is in the middle of swapping its state from one server to another, a brief outage (such as less than one second) may result, and an MCOS software driver will retry until the connection to the Azure® SQL service is resumed, avoiding data corruption caused by the outage. A longer data center upgrade outage, which may for example last over fifteen minutes, is handled in a similar manner.

Figure 5A:
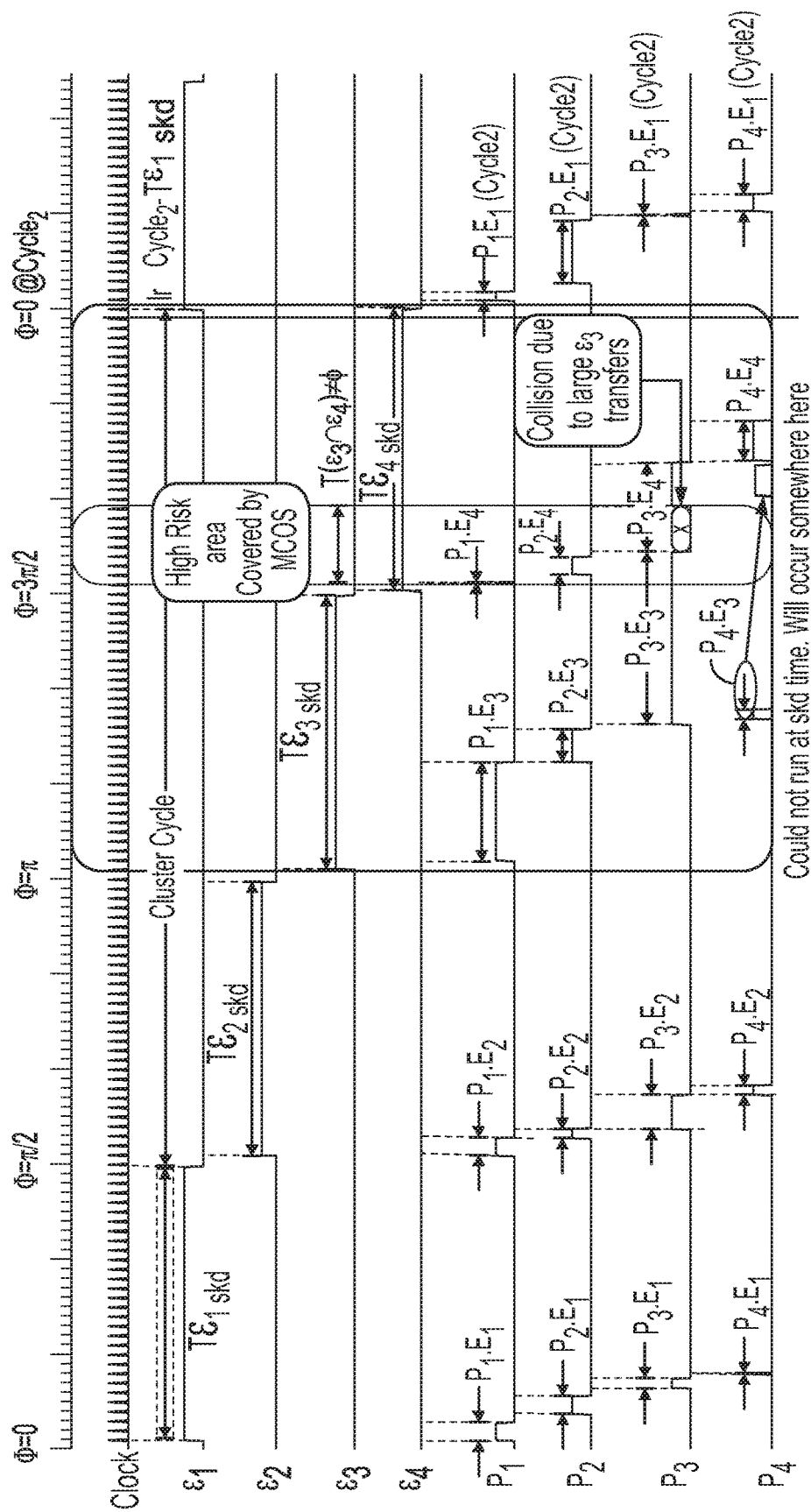
FIG. 5a is a timing diagram illustrating the activities of four instance engines of a cluster relative to their respective scheduled quadrants of a clock cycle.
Figure 5B:
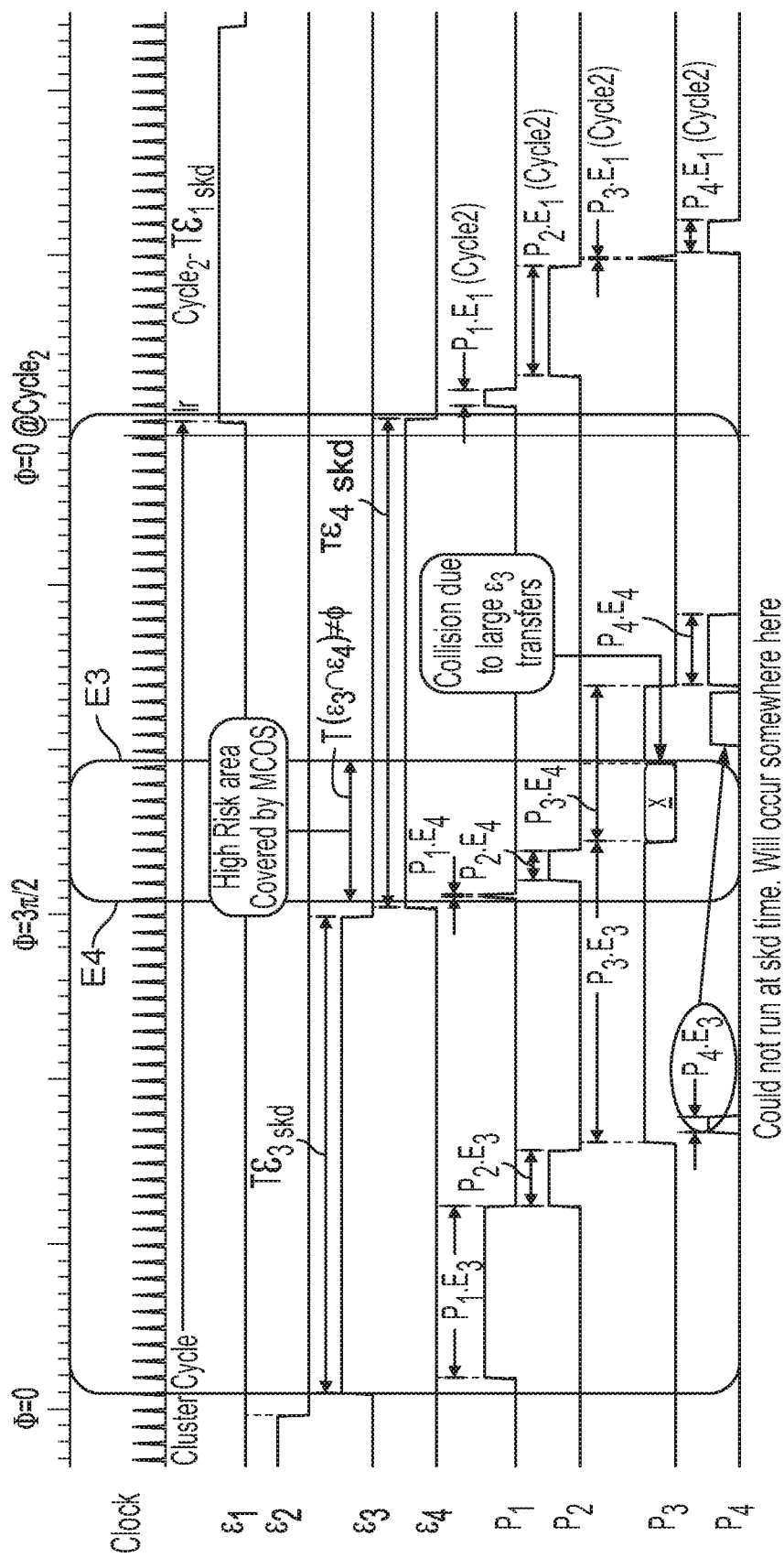
Figure 6:
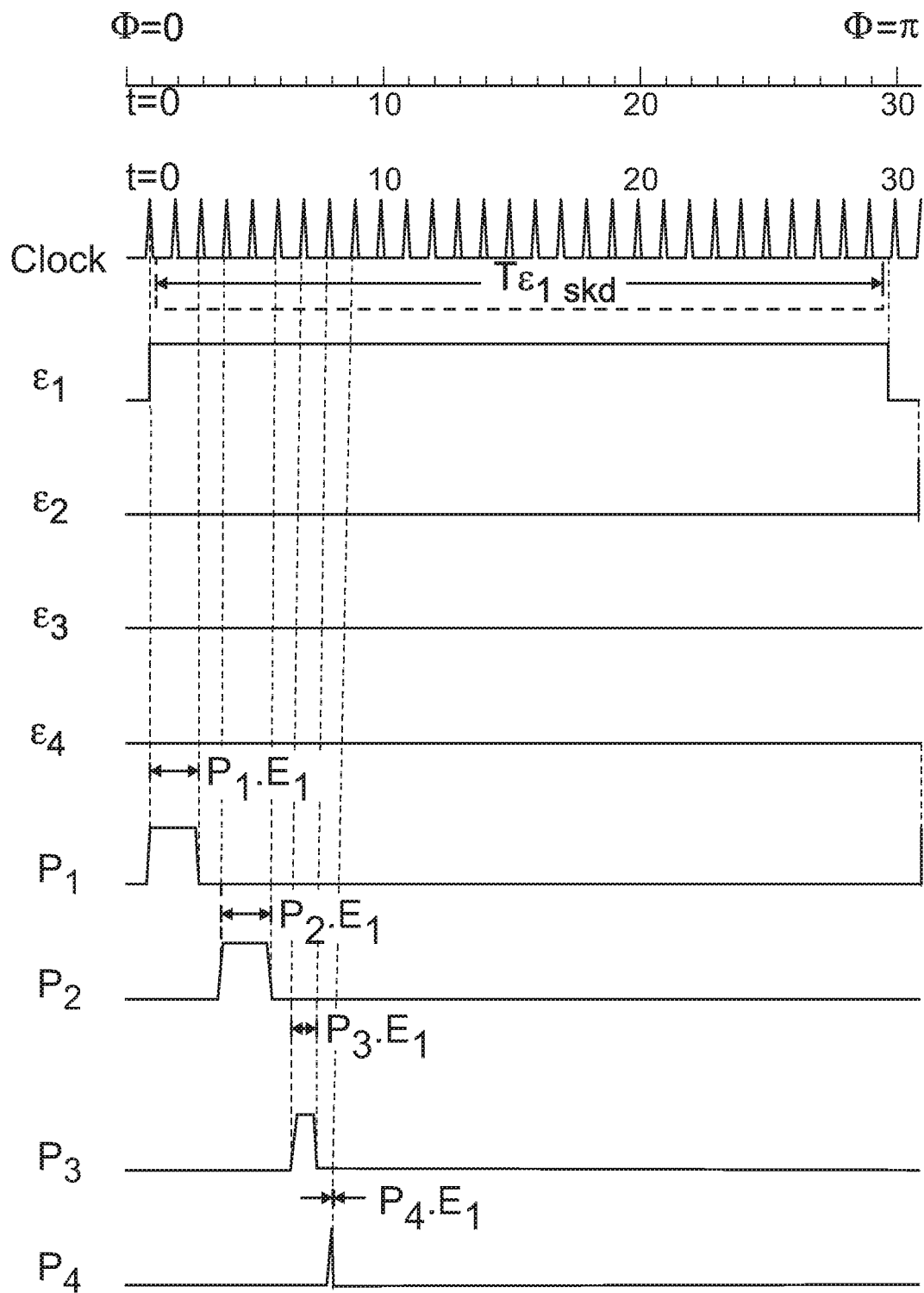
FIG. 6 is an enlargement of the first quadrant of the timing diagram shown in FIGS. 5a-5b.
Figure 7:
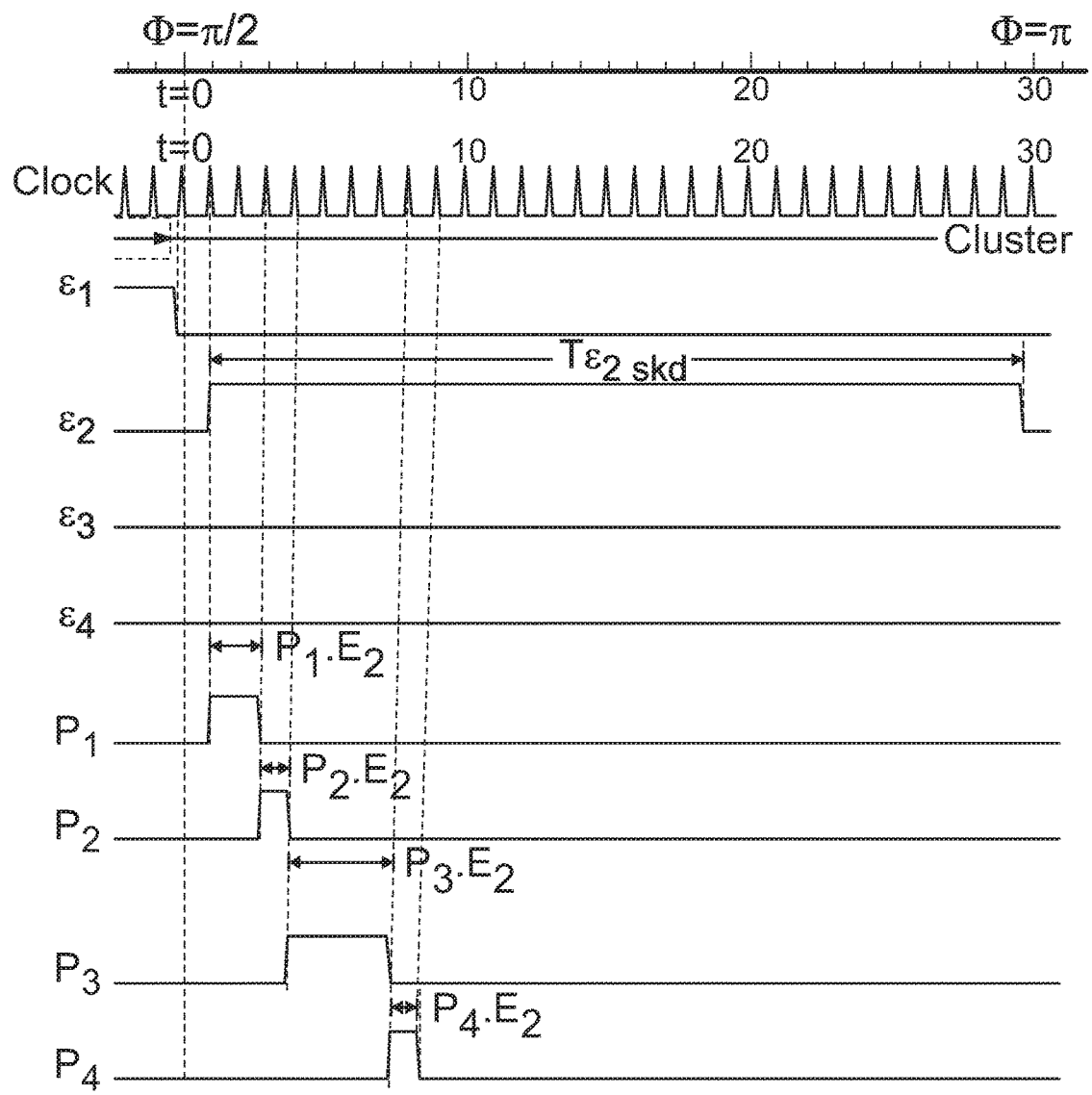
FIG. 7 is an enlargement of the second quadrant of the timing diagram shown in FIGS. 5a-5b.
Figure 8:
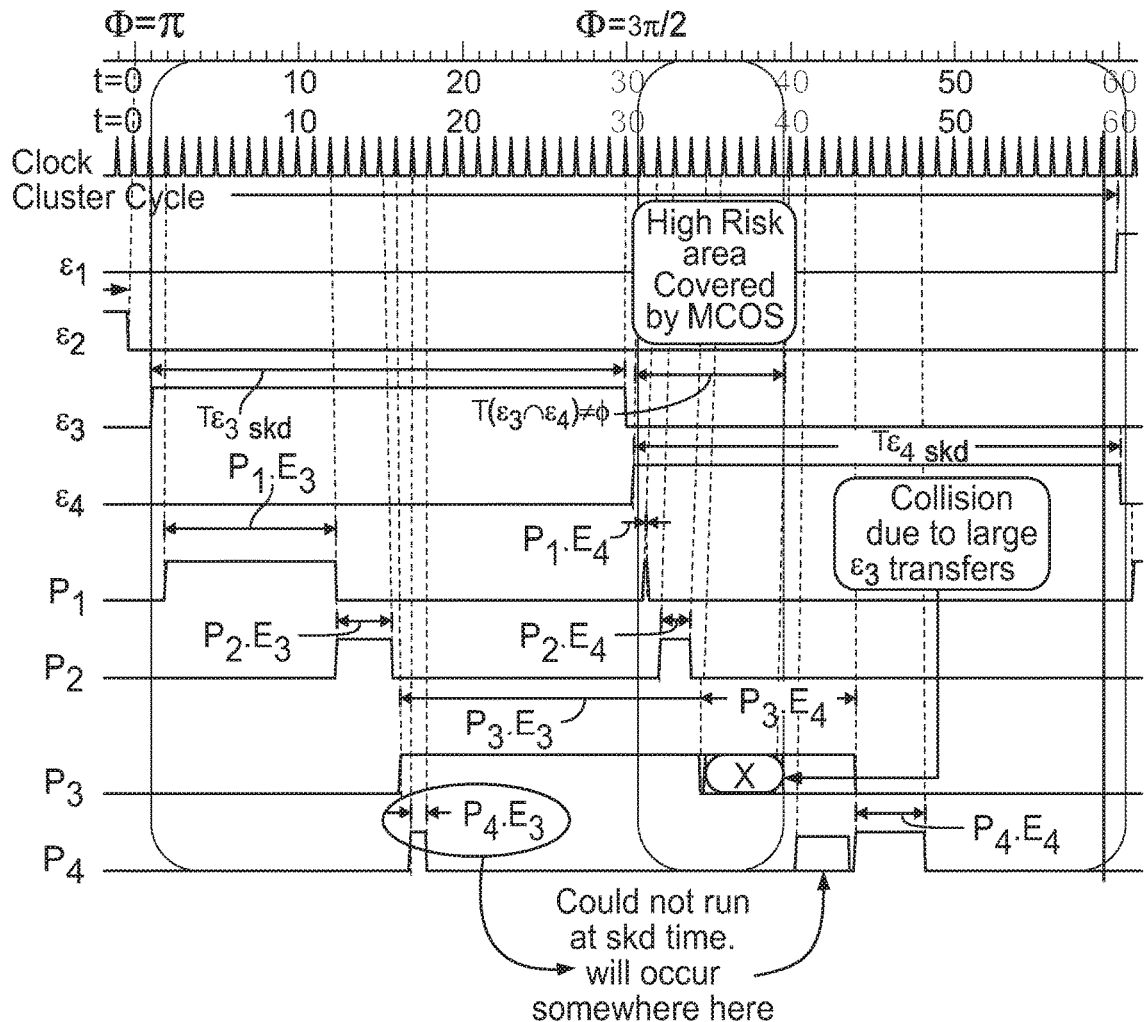
FIG. 8 is an enlargement of the third and fourth quadrants of the timing diagram shown in FIGS. 5a-5b.

The situation of overlapping instance activity is depicted in a timing diagram in FIG. 5a, while FIG. 5b shows the risky area of quadrants $E_3$ and $E_4$ magnified for readability. Since there are four instance engines $\varepsilon_1$-$\varepsilon_4$ each one gets a quarter of a polling cycle. It depicts a simplistic collision avoidance scenario where each engine $\varepsilon_1$-$\varepsilon_4$, runs exactly the same batch job (same processing logic) of file transfers of trading partners $P_1$-$P_4$, said batch jobs being also referred to herein as "profiles $P_1$-$P_4$" (generically, "profiles" are non-overlapping subsets of all orthogonal spatial segments 20 of gateway storage volume D, depicted by the unique hatch patterns in FIG. 2, and profiles may be assigned to transfers to/from a particular trading partner $P_x$, transfers to/from a particular customer $CU_x$, some other basis that justifies reserving a portion of the physical space in gateway GW for one purpose). This demonstratively simplistic batch job graphed in timing diagram is triggered exactly at the start of its statically scheduled ("skd") time window: $E_i$=T($\varepsilon_{iskd}$) (where i=1 to 4). To maximize design safety, schedules of other instances have been allocated different windows of time for collision prevention. This is the same scenario that was previously depicted in FIG. 3 where instance engine $\epsilon_1$ and instance engine $\epsilon_2$ were operating with the inherently designed isolation in space/time, and a brief overlap (conflict) probability between instance engines $\epsilon_3$ and $\epsilon_4$ was addressed in greater detail in FIG. 4. Note that time windows $E_1 \ldots E_4$ are marked as quadrants in FIG. 3 to link the Euler diagram representation with the timing diagram representation of this scenario.

The timing diagram of FIGS. 5a-5b illustrates how MCOS performs a cautious, turn by turn, download of business documents of trading partners $P_1$-$P_4$, by all four instance engines $\epsilon_1$-$\epsilon_4$. Within a schedule, the only guarantee is the sequence of their start times (determined by batch job instructions), not their duration, which is a function of their cumulative file size (e.g., in KB), transfer protocol encapsulation/handshake overhead, and network throughputs (e.g., in KB/sec). The timing diagram at FIGS. 5a-5b is predictable in the first two quadrants ($0<=\phi<=\pi$); but not in the latter part of quadrant $E_3$ extending/protruding into initial period of quadrant $E_4$. As described in the explanation of FIG. 4, instance engine $\epsilon_3$ was not yet finished downloading $P_3$ when instance engine $\epsilon_4$ kicked off its batch job. Instance engine $\epsilon_4$ very quickly downloaded documents of profiles $P_1$ and $P_2$, and found many documents of profile $P_3$ that were still not downloaded—actually, instance engine $\epsilon_3$ was already busy downloading them behind the scenes. In this example, since instance engines $\epsilon_1$-$\epsilon_4$ have no knowledge of their peers, instance engine $\epsilon_4$ would have accidentally begun downloading profile $P_3$ jobs that were still being downloaded by instance engine $\epsilon_3$ (absent the locking/arbitration mechanisms of the present invention). The timing diagram includes a rounded rectangle $E_3$ depicting the actual time frame of $E_3$ activity, which partially overlaps with a rounded rectangle $E_4$ depicting quadrant $E_4$, resulting in a high risk overlap area managed by cloud operating system 22. Another rounded rectangle X depicts a region where an actual collision occurred due to the large load on instance engine $\epsilon_3$. In summary, despite all design precautions to segregate/stagger schedules, the collision probability cannot ever be reduced to zero. In fact when schedules are staggered in time domain, stability is increased, but the productivity/yield falls by the same amount (i.e., engines stay idle in those safety zones while work keeps piling up at the delivery/receipt area (gateways)). Notwithstanding these challenges, the permission engine of the invention creates a high degree of utilization for clusters 12, while guaranteeing the stability and integrity of business document transfers.

The timing diagram shown in FIGS. 5a-5b was explained in the previous paragraph. The chronological sequence of events is now analyzed. As previously explained, for the sake of simplicity, the processing load is uniformly divided into four parts (instance engines $\epsilon_1$-$\epsilon_4$.) Instance engines $\epsilon_1$-$\epsilon_4$ process documents in an identical manner. There may be, say, one hundred trading partners needing access to the document processing service. However, for the sake of simplicity, only four of them, $P_1$-$P_4$, are shown in the drawings. In this simplistic collision avoidance scenario, although all four instance engines $\epsilon_1$-$\epsilon_4$ could be processing these four trading partners' documents simultaneously, only one instance engine $\epsilon_1$-$\epsilon_4$ is scheduled to be active at a time, kicking off its batch job at the first clock tick after the start of its assigned time quadrant $E_1$-$E_4$. Therefore, in quadrants $E_1$-$E_4$, there is theoretically no probability of collision due to schedule conflicts (the transfers of instance engine $\epsilon_i$ starting well within the boundaries of quadrant $E_i$.) The duration of a document transfer, however, is a function of payload size, Internet bandwidth, and protocol overhead, any of which can vary by orders of magnitude. This is exactly what happened when the job of instance engine $\epsilon_3$ protruded into quadrant $E_4$. For the sake of simplicity, in the illustrated example, a clock ticks every second and 30 seconds of processing time are allocated to each quadrant. As explained before, each quadrant will display activity of just one engine (except for the last quadrants where batch jobs of two instance engines collided while transferring the same trading partner documents).

In the following discussion, the symbols $E_1$, $E_2$, $E_3$ and $E_4$ are used to refer to the scheduled activities of instance engines $\epsilon_1$-$\epsilon_4$ in the respective quadrants/time windows $E_1$-$E_4$, as in "$E_1$ activity."

The events during first quadrant $E_1$ ($0<=\phi<=\pi/2$) are now analyzed. There are four downloads by the instance engine $\epsilon_1$, namely, downloads $P_1.E_1$, $P_2.E_1$, $P_3.E_1$, and $P_4.E_1$. Download $P_1.E_1$ started at the first clock tick (t=1 sec) and took two seconds to complete. After a second of rest, download $P_2.E_1$ was kicked off at the 4th clock tick, and took another two seconds. Download $P_3.E_1$ took only a second to complete, while download $P_4.E_1$ did not find any document to download, and hence finished within a fraction of a second. All $E_1$ activity occurred well within the 30 seconds allocated to instance engine $\epsilon_1$. Other instance engines were not scheduled to kick off their batch jobs during this period.

Immediately after the 30th second, when instance engine $\epsilon_1$ ceases its scheduled activity, the next quadrant ($E_2$) starts. Quadrant $E_2$ is active between ($\pi/2<=\phi<=\pi$). Like instance engine $\epsilon_1$, the batch job of instance engine $\epsilon_2$, constituting four scheduled downloads $P_1.E_2$, $P_2.E_2$, $P_3.E_2$, and $P_4.E_2$, also starts at the first clock tick after t=0 ($\phi=\pi/2$). Similarly, $E_2$ activity is also scheduled to stay within the window of 30 seconds of allocated time (starting 1 second late means it has only 29 seconds to finish off all downloads). Since the document size at that time (in this example) was moderate, it took about eight seconds (2+1+4+1) to download every document belonging to all four trading partners. Note that although instance engine $\epsilon_2$ was actually active between the 31st and 60th seconds of elapsed time, each quadrant is designated as beginning at t=0, relative to its respective 30-second schedule. All $E_2$ activity was completed before the 10th second tick (out of 30 seconds of scheduled allocation).

Here, the most important quadrants are quadrants $E_3$ and $E_4$, because that is where the collisions are shown to be occurring.

Quadrant $E_3$ is first examined and is active between ($\pi<=\phi<=3\pi/2$). Although instance engine $\epsilon_3$ is no different from its peers (even its batch job mirrors that of other engines), by coincidence, large document transfer jobs were queued up in the gateway server when the schedule of instance engine $\epsilon_3$ began to run. Download $P_1.E_3$ started at t=2 sec (elapsed time 62 Seconds). Trading partner $P_1$ uploaded large documents, and it took instance engine $\epsilon_3$ over 10 seconds (until t=12s) to download them.

The batch job then downloaded the jobs of trading partner $P_2$. Download $P_2.E_3$ took another three seconds (Until t=15s).

Note that instance engine $\epsilon_3$ only had fifteen more safe seconds before $E_4$ activity was scheduled to start.

When instance engine $\epsilon_3$ started downloading the jobs of trading partner $P_3$, even those were very large, requiring about 25 seconds of aggregated transfer time. It could not finish downloading them before t=40 seconds (or t=10 seconds with respect to the risky quadrant $E_4$).

Engine $\varepsilon_3$ then began yet another risky transfer of the documents of the remaining trading partner $P_4$, between t=41 and t=44. Recall that in this example, no locking, arbitration, or permission mechanism according to the invention is in place.

The static behavior of a similar batch job running on instance engine $\varepsilon_4$ in quadrant $E_4$ ($3\pi/2<=\phi<=2\pi$) will now be examined. At t=30 seconds relative to quadrant $E_3$ (elapsed time 90 seconds), instance engine $\varepsilon_4$ began its scheduled $E_4$ activity, kicked off at next clock tick (t=31 sec). It is exactly the same batch job that was previously executed by three other engines in their respective turns (quadrants). Trading partner $P_1$ did not have any documents to transfer; therefore, download $P_1.E_4$ finished the same second. At the next clock tick (t=32 sec), trading partner $P_2$ is serviced, initiating download $P_2.E_4$. The transfer only takes a couple of seconds. At the next clock tick (t=36 sec), instance engine $\varepsilon_4$ starts download $P_3.E_4$. As described above, instance engine $\varepsilon_3$ was still busy transferring documents of trading partner $P_3$ at that moment, and hence collided with instance engine $\varepsilon_4$ trying to download exactly the same document. The collision outcome could be a duplicate document transfer, a deadlock, or any other undesirable integrity issue. The exact outcome of that collision or when it would have ceased to exist cannot be deterministically predicted, but in any case, the batch job of instance engine $\varepsilon_4$ still needed to service the last trading partner $P_4$. For the sake of simplicity, it is assumed that instance engine $\varepsilon_3$ was already done with download $P_4.E_3$ when instance engine $\varepsilon_4$ began download $P_4.E_4$. To remain focused on the earlier collision, it is assumed that the second collision was narrowly avoided.

As illustrated by the above example, it will be noted that only document transfer start times can be practicably controlled, not their durations. The duration of any given transfer could be arbitrarily long, and collision probability is not completely eliminated despite interposition of large theoretical dead zones. Therefore, 100% integrity cannot be guaranteed without sacrificing production efficiencies/pipeline throughputs. In addition, it shall be understood that the foregoing was only a simplistic/hypothetical scenario normalized to a schedule of 30 seconds per instance. In reality, document size varies by orders of magnitude (and hence transfer duration), thus scheduling is optimized after careful study of transfer history, and adjusted where needed. Back-to-back scheduling configured so that the next instance asynchronously starts downloading upon completion of the previous instance's activities, as confirmed by a client component CC transmitting a completion signal to server component SC, is preferably implemented as appropriate to avoid or minimize lull periods. Likewise, simultaneous access of spatially orthogonal segments of gateway GW by multiple instance engines is preferably implemented as appropriate to increase utilization of the gateway storage volume. In addition, schedules can be parameterized with adjustable trigger offsets based on load conditions and/or actual demands. Advantageously, cloud operating system 22 can be configured with baseline initial values of parameters that define or determine what condition or clock time will trigger the start of a transfer profile and/or the activity of a particular instance engine, and after learning from usage patterns, each transfer profile may be adjusted to improve throughput yields through a "machine learning" process. In particular, an independent telemetry/instrumentation mechanism may be deployed, according to which activity knowledge gathered by client components CC is provided in activity reports to server component SC, and server component SC synthesizes all the activity reports to generate improvements to an evolving permission granting algorithm. Permission granting algorithm improvements may, for example, come in the form of optimized file transfer activity start times and/or polling frequencies.

Advantages and benefits attained by cloud operating system 22 include but are not limited to the following:

1. Latency is reduced and throughput performance increased compared to existing EDI systems.

2. The need for static segmentation access restrictions at gateway system 14 is eliminated; instead file access is dynamically granted by cloud operating system 22.

3. Gateway GW is partitioned at a fine granular level into segments allocated according to parameters such as the identity of the trading partner $P_1 \ldots P_n$, the identity of the MegaXML® document interchange service customer $CU_1 \ldots CU_i$, uploads, and downloads. Although only one disk D is shown in FIG. 2, there could be multiple concentric surfaces, each with a different role, (e.g., separate disks D for $B_1$ and $B_2$ ends, where each disk may represent a separate physical server, a separate physical space, or a set of segments that are each orthogonal to all of the segments of the other disk in space-time).

4. Because of the high number of orthogonal segments 20 (or even multiple disks D), many activities can occur simultaneously without impeding one another.

5. Spatially orthogonal segments facilitate simultaneous transfers, and temporally orthogonal segments facilitate transfers through the same space on a turn basis.

6. All cluster instances share exactly the same spatial profile of segments 20 in gateway GW and the same MegaXML® engine artifacts (including file format adapters, maps routing $B_1$ end fields to $B_2$ end character positions, and translators which transfer document contents encapsulated in XML with document contents in EDI format)—they even share Counters, tables, XSDs, XSLTs, and Virtual pipelines. Nothing should happen if one instance dies. Others will keep on working. A portal/dashboard called QRPT in the MegaXML® platform (hereinafter "QRPT"), displays all MegaXML® engine activities and includes an alert system to warn the administrator who can safely bring the bad instance on line without any interruption in service. This bumps up reliability, integrity, and takes off the burden of backing up/syncing instance state, as critical state variables are stored outside of instance (in Git®, and Azure® SQL).

Figure 22:
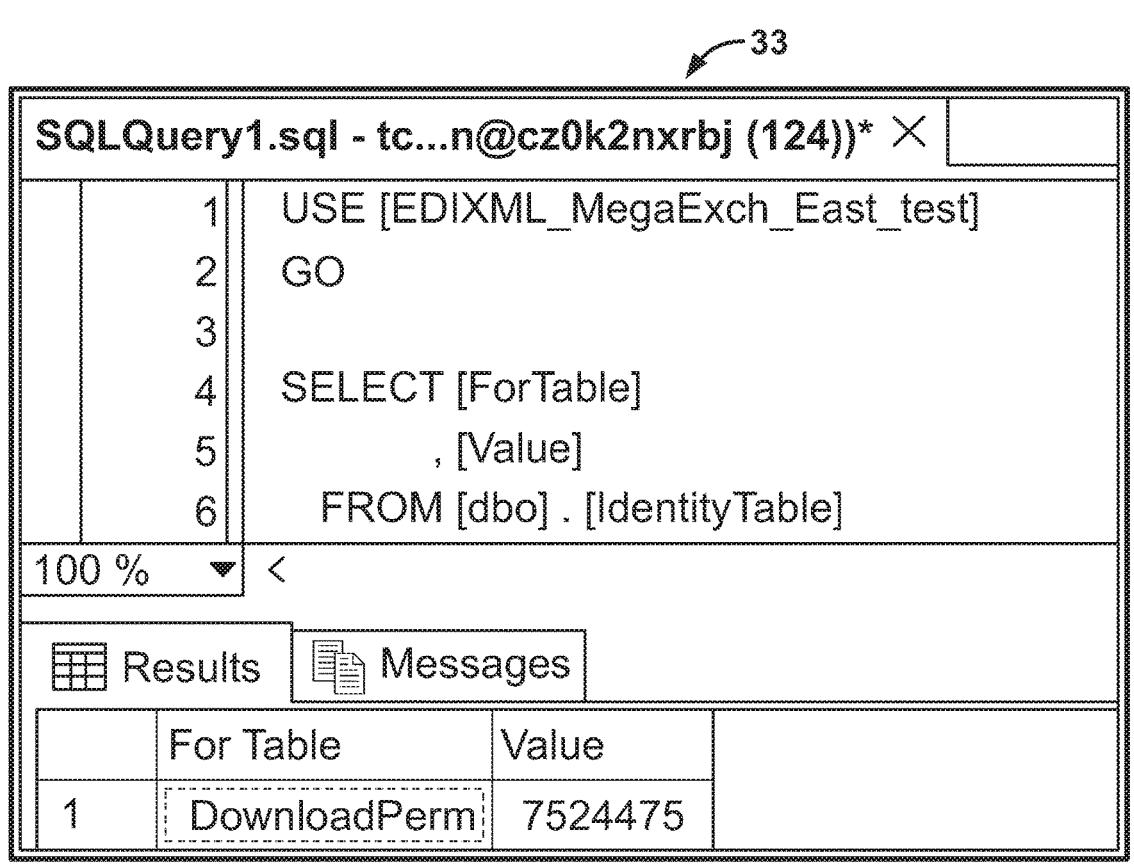
FIG. 22 is a screen capture image of an identity counter table used to supply permission ID values for client agents of server instances managed by a cloud operating system according to the invention.

7. Critical code footprint (and hence the latency) of lockable database stored procedure and counters is minimized. Server component SC only grants a permission ID, as further described below with reference to FIG. 22, and lets the instances themselves manage the downstream operations in a distributed environment without loading the precious centralized server resources.

8. Existing Python FTP structure in many cases can be readily incorporated into cloud operating system 22 to achieve loose coupling. Python scripts may still be executed in the context of PowerShell environments managed by cloud operating system 22.

9. Cloud operating system 22 grants permission to all upload requests with unique file names without any delay as they are inherently conflict free (cannot be overwritten by another instance) because of architectural topology.

10. $B_2$ end uploads for legacy concatenating customers use special PowerShell created virtual circuits (tunnels) to communicate with a complementary "FTP Server Control" agent at gateway end GW $B_2$.

11. $B_2$ end downloads for legacy file set affinity based customers use extra PowerShell post processors to re-combine the fragmented set across multiple instances by assembling headers/details etc. and deliver immediately adaptable data set.

12. Provision for load balancing: client agents running cloud operating system 22 must provide details of processing loads to the instrumentation modules. This would allow optimized allocation permissions for requested documents transfers.

13. In cloud operating system 22, each client component CC; can tune the document transfer parameters (e.g. throttling) so that no single instance; should accidentally pick up an unlimited number of documents and queue them up at a single instance (while others remain in idling state).

14. Cloud operating system 22 addresses the inherent impedance mismatch between supply and demand, i.e. surge in demand versus finite processing capability of available instances. During peak seasons (they may be different for different market segments), it should allow adding of more instances in cluster without much effort. Similarly, during low demand periods, it should allow easy shutdown/de-allocation of idling instances to save the operational cost.

Software components of cloud operating system 22 of the present invention can be divided into two broad groups: core components 24 and specialized components 26. Both will be described in following paragraphs.

Core Components

At the top level, cloud operating system 22 has just one server component SC residing in external computer system 18, but a cluster can have as many client agent components as there are instances in that cluster. For process flow details/events/triggers, refer to the sequence diagram, FIG. 17.

Server component SC is a system-wide service software that is preferably housed (as a stored procedure interacting with other server side objects) in a triplicate backed up/swapping Azure® SQL database engine, hosted by Microsoft in external computer system 18 outside cluster group 11, as shown in FIG. 1. Client components CC send requests to server component SC. Each request must be complete in all respects (i.e., must pass every aspect of the context variables). Typical context variables passed as arguments to a request call are: status of requesting instance$_i$, area of interest (e.g., trading partner $P_1$ interacting with cluster 12b through gateway end $B_1$ to do business with customer $CU_i$.), Instance ID, expected pre-transfer timeout period after which instance$_i$ is assumed dead if a transfer is not yet commenced (a separate timeout for the duration of the transfer itself may be handled by client component $CC_x$ itself, as determined from variables such as system-wide configuration settings and file size), and the type of request (e.g. download permission request (Phase 1,) or download completion signal (Phase 2) with a SQL table list of downloaded files).

As stated above, cloud operating system 22 limits the amount of time spent by the processing logic in server component SC, thereby reducing the risk of the controller entering an unstable state. A skillful usage of Azure® SQL locks/modes has been incorporated at every level to achieve a high frequency of request/response operations without risking any integrity/reduction of server responsiveness. The MCOS service is written as Azure® SQL stored procedure in the Transact-SQL (T-SQL) language.

Client components wait until they get permission to go ahead with a data transfer from gateway GW. At the level of gateway GW, this access is guaranteed to be exclusive. Those milliseconds of server processing are very critical, as counter tables are locked to prevent duplication. Once the server component SC decides that it is okay to let a particular instance 16a-16d connect with a requested profile of segments 20 of gateway GW (note the segments are shrunk to the smallest possible slice size in order to maximize the task parallelism), it returns a success message granting it a permission ID that would be used in subsequent calls/data transfer/logging.

Once an MCOS client component $CC_i$ receives that ID, it constructs the necessary environment to do the transfer, and launches the transfer script using the configuration specified in its invocation by the scheduled batch job. Typically, the transfer script is a Python FTP transfer script that is kicked off by a PowerShell component of a processing server instance 16a-16d. The configuration is also written as a small Python FTP configuration script with finer details, such as which server to call, transfer mode(s) (passive or active), local and remote directory location, how the document will be archived to prevent duplication, timeout value(s), and value(s) of other communication parameters.

Note that to maximize parallelism; even the maximum number of files per session and maximum transfer session duration, etc.; are configurable for fine tuning of all instances 16a-16d under different conditions. Note that server component SC allocates its priorities by listening to the request parameters (conditions) that are all fully configurable at the level of server instances 16a-16d. For example, one MegaXML® document interchange service customer $CU_i$ may have a time critical need for certain transactions with a sensitive buyer, for whom even a few minutes of document arrival delay can cause serious business consequences. Cloud operating system 22 can schedule that requirement at multiple instances with a higher than usual frequency. That way the overall latency/aggregate response time at its $B_2$ end would dramatically shrink. On the other hand, there may be a legacy MegaXML® document interchange service customer CU; with very large sized concatenated document stream, but transferred only by a daily batch job that runs at midnight. In cloud operating system 22, needs of customers CU can be met by adjusting schedules at MCOS clients CC so that the most appropriate pipeline processes the daily batch job stream at the agreed upon time.

Specialized $B_2$ End EBCDIC/Binary Streams Handling Components

Not all document transfer scenarios can be distributed on multiple instances 16a-16d without any adverse consequence. Legacy systems, particularly those using Mainframe/AS400 files, may inherently require a centralized process having a much higher degree of impedance mismatch with distributed environments. There is hardly ever a one-to-one mapping between the $B_2$ end physical file set and a corresponding $B_1$ end trading partner business document. For example, just to create $B_2$ end physical files corresponding to EDI purchase orders, we would need to first create multiple physical files in ASCII, then turn them into EBCDIC and concatenate into a single byte stream with a static file name. Imagine another P.O. comes for the same $B_2$ end customer, but this time from another $B_1$ buyer. We would need to do exactly the previous steps, but would then re-open the (potentially un-downloaded) file set, and concatenate the new streams after the old stream that were created as a result of P.O. processing from previous $B_1$ buyer. Coupled with the potential of multiple instance access conflicts, we would then need to incorporate specialized end point agents that do not let any single instance output overwrite the files, that could be under creation (only partially finished) from any other instance. A central controller paradigm could not efficiently manage the traffic from so many different instances without badly locking them all down. That would result in very poor performance (or questionable document integrity if the locking scheme is made too optimistic). Therefore, cloud operating system 22 has specialized handler modules, termed specialized client components $CC'_1 \ldots CC'_n$ (or generically CC') that are distributed on every instance 16a-16d to regulate the transfer process without bogging down server component SC with multiple interrupts generated from $B_2$ end. Specialized client components CC' handle transfers to and from such legacy systems interacting with a cluster through the $B_2$ end.

We can explain the challenges of this tricky situation by walking through a use case of an outbound invoice. Even a single invoice, destined for a single $B_1$ end partner may come in four parts (physical files). Those parts constitute a business document (invoice) incorporated in a header file with multiple "details" files. The standard scheme of cloud operating system 22 would allow cluster instances 16 to pull out different parts at different instances 16. The result would not be complete enough for the consumption of an outbound adapter, as different parts of the same invoice may arrive at different instances 16 (even different timings), and would remain queued up forever as none of the adapters (of those different instance engines) would be able to process an incomplete invoice (parts are potentially scattered at multiple instances). To address this in cloud operating system 22, specialized client component $CC'_i$ (as alluded to in the previous paragraph) watches the network paths of all cluster instances 16 provisioned for this pipeline processing, and pulls out the details files from instances 16 distributed on VLAN into the instance with header and assembles/links them. Therefore, the outbound adapter is only kicked off with the complete set of invoice parts, assembled by specialized MCOS client component $CC'_i$.

Derivative/Secondary Benefits

Cloud operating system 22 enables many benefits due to its rich logging capabilities supplied by integrated views on server, and dozens of useful activity logs created on each instance. In the case of MCOS, the MegaXML® platform administrative portal QRPT is its biggest beneficiary. In order to optimize the physical clusters, we must have those instrumented baselines plugged into the mathematical model whose fundamental equations are briefly discussed above.

VM Resource Utilization by Every Instance

Figure 10:
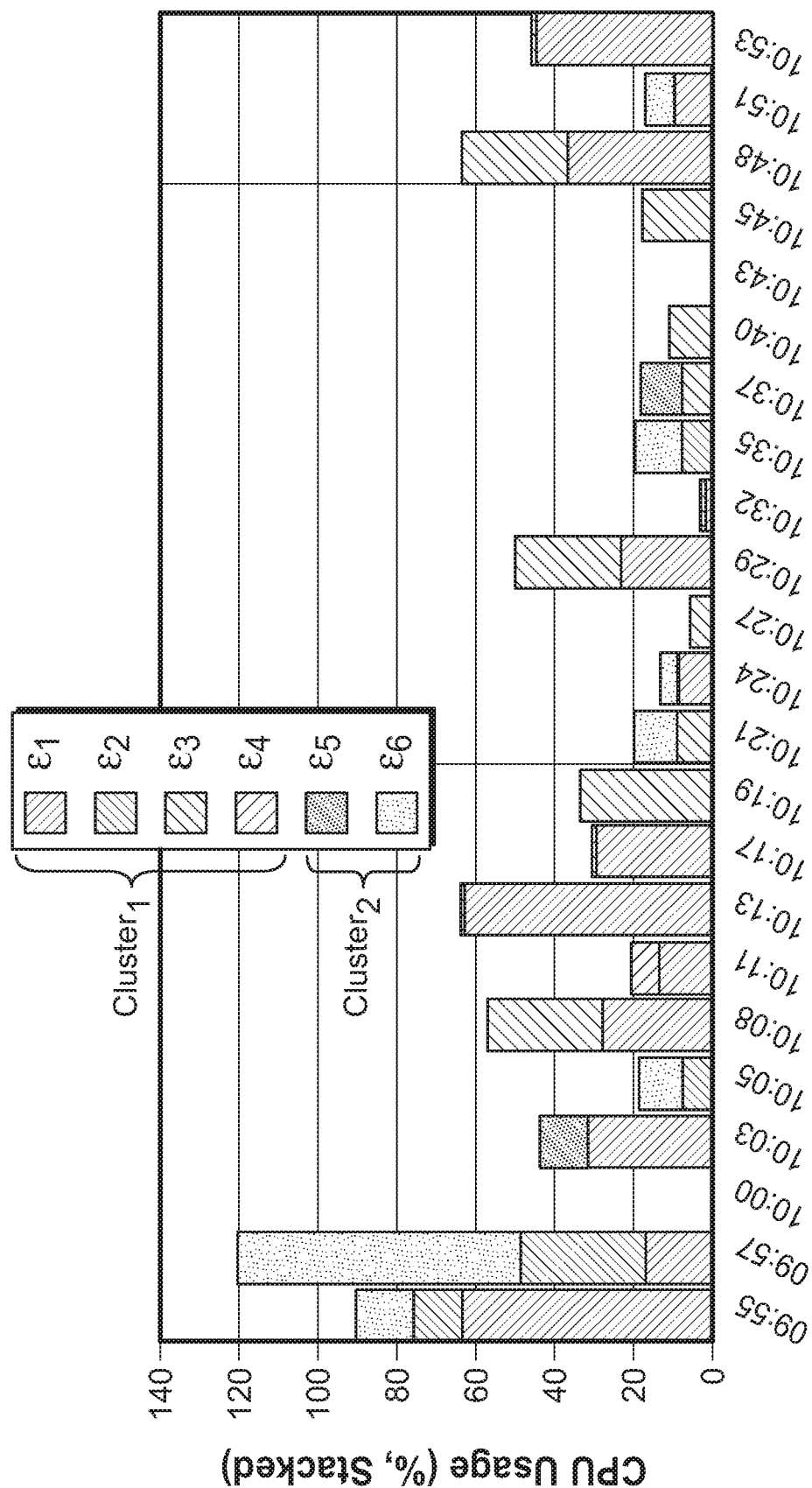
FIG. 10 is a diagram illustrating the CPU usage of six server instances in two clusters managed by a cloud operating system according to the invention, sampled at various times.
Figure 11:
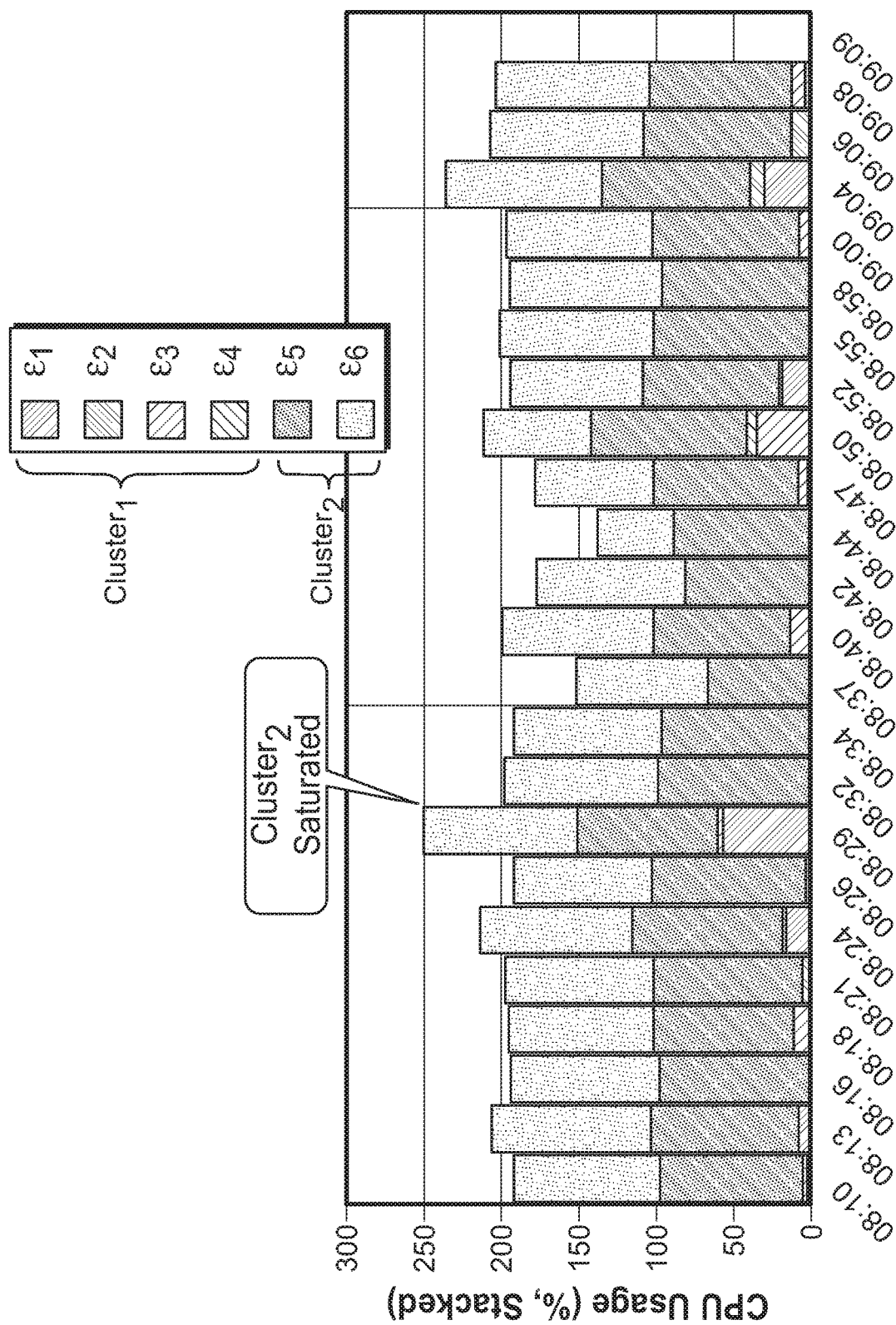
FIG. 11 is a CPU usage diagram for the two clusters referenced in FIG. 10, illustrating how a cloud operating system according to the invention manages a scenario in which CPU usage of one of the clusters remains saturated over a one-hour period.

As noted above, QRPT is the central tool for management of all MegaXML® platform activity on network 10. It displays a real time status of all document processing engines (instances) and gateway resources (e.g. VMs, services, etc.). It provides the status of every deployed instance powering the clusters. The MCOS instrumentation components of cloud operating system 22 supply enough information through their views to QRPT. This information enables monitoring/administration of all services in the MegaXML® cloud. QRPT in return provides dashboards/visual feedback on different aspects of cloud operating system 22, e.g. how different instances are performing, i.e., how they are processing the cluster load, data transfer integrity of bidirectional GW to cluster exchanges, poorly performing transfer profiles, etc. In reports of QRPT shown as screenshots in FIGS. 10 and 11, we see how all six instances $\{\varepsilon_1 \ldots \varepsilon_6\}$ (belonging to two different clusters Cluster$_1$ and Cluster$_2$) are performing. Cluster$_1$ has instance engines $\{\varepsilon_1 \ldots \varepsilon_4\}$; while Cluster$_2$ has instance engines $\{\varepsilon_5, \varepsilon_6\}$. FIGS. 10-11 provide insight into internals of a processing/prioritization mechanism of cloud operating system 22, and are now examined in detail.

In FIG. 10 we notice that at 9:57, the total CPU usage of all clusters exceeded 100% but the peak load on clusters was on 50% and 70% respectively. MCOS is making the clusters run like a well-oiled machine. Cluster$_2$ suddenly became heavily loaded at 9:57 by its instance engine $\varepsilon_6$. However, MCOS noticed the load on instance engine $\varepsilon_6$, and gave the next document to instance engine $\varepsilon_5$ for processing (at 10:03). While instance engine $\varepsilon_5$ was busy processing jobs at 10:03, and instance engine $\varepsilon_6$ was free again, it gave the next document to instance engine $\varepsilon_6$ at 10:05.

Referring now to the Cluster$_1$ usage, we see that MCOS starts CPU loading from instance engine $\varepsilon_1$, which appears to work most in this one-hour period. However, we find MCOS spreading the load to instance engine $\varepsilon_2$ most of the time. At 10:05, even instance engine $\varepsilon_2$ was busy, so the load went to instance engine $\varepsilon_3$ at 10:08, and even to instance engine $\varepsilon_4$ at 10:11. These finely granular readings in real time let cloud operating system 22 manage all instances without unfairly overloading any single instance.

Analysis of Transfers Between Gateway Server and Cluster$_2$

Figure 12:
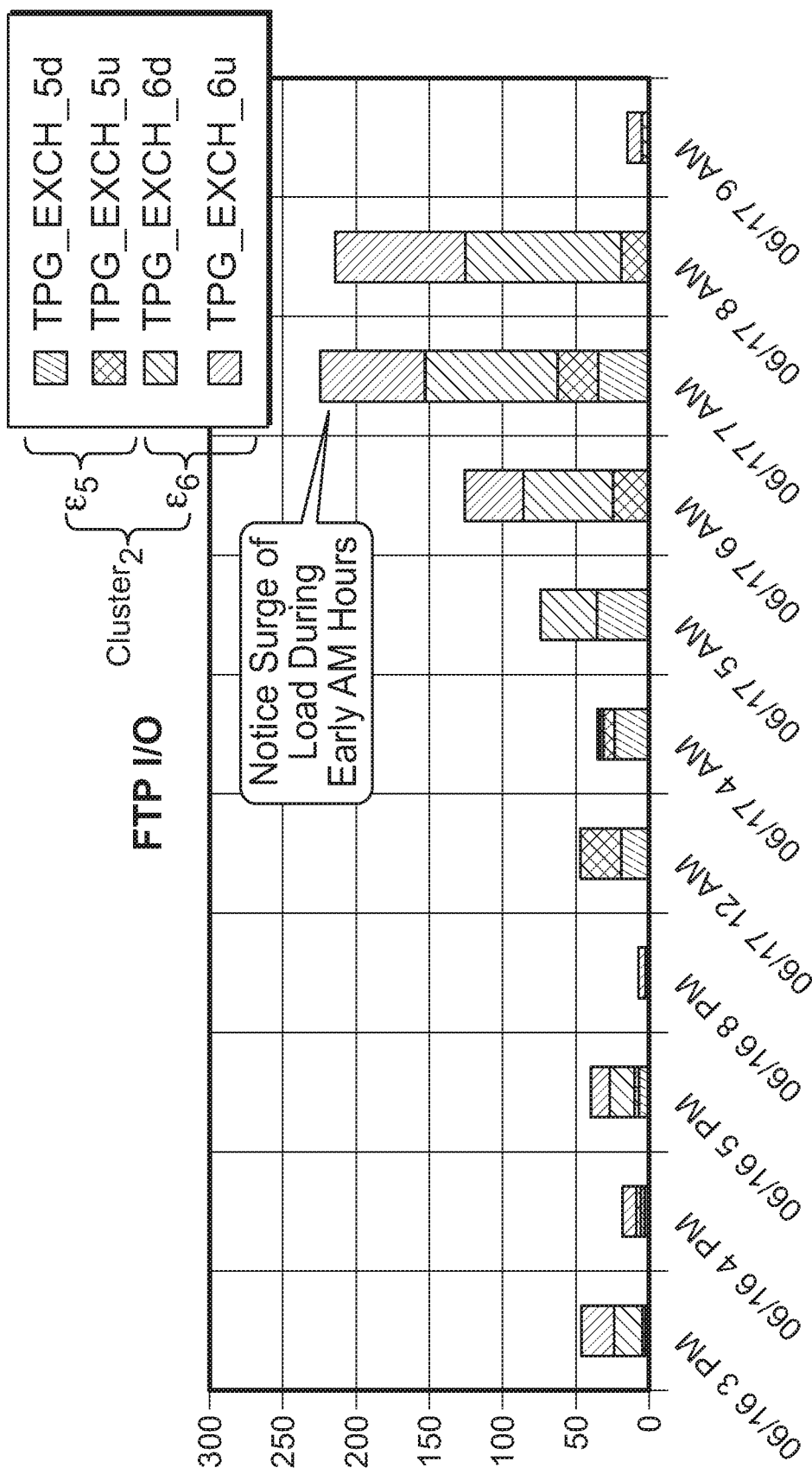
FIG. 12 is a diagram of the upload and download activities sampled at various times for a two-instance server cluster managed by a cloud operating system according to the invention experiencing an early morning surge in load.
Figure 13:
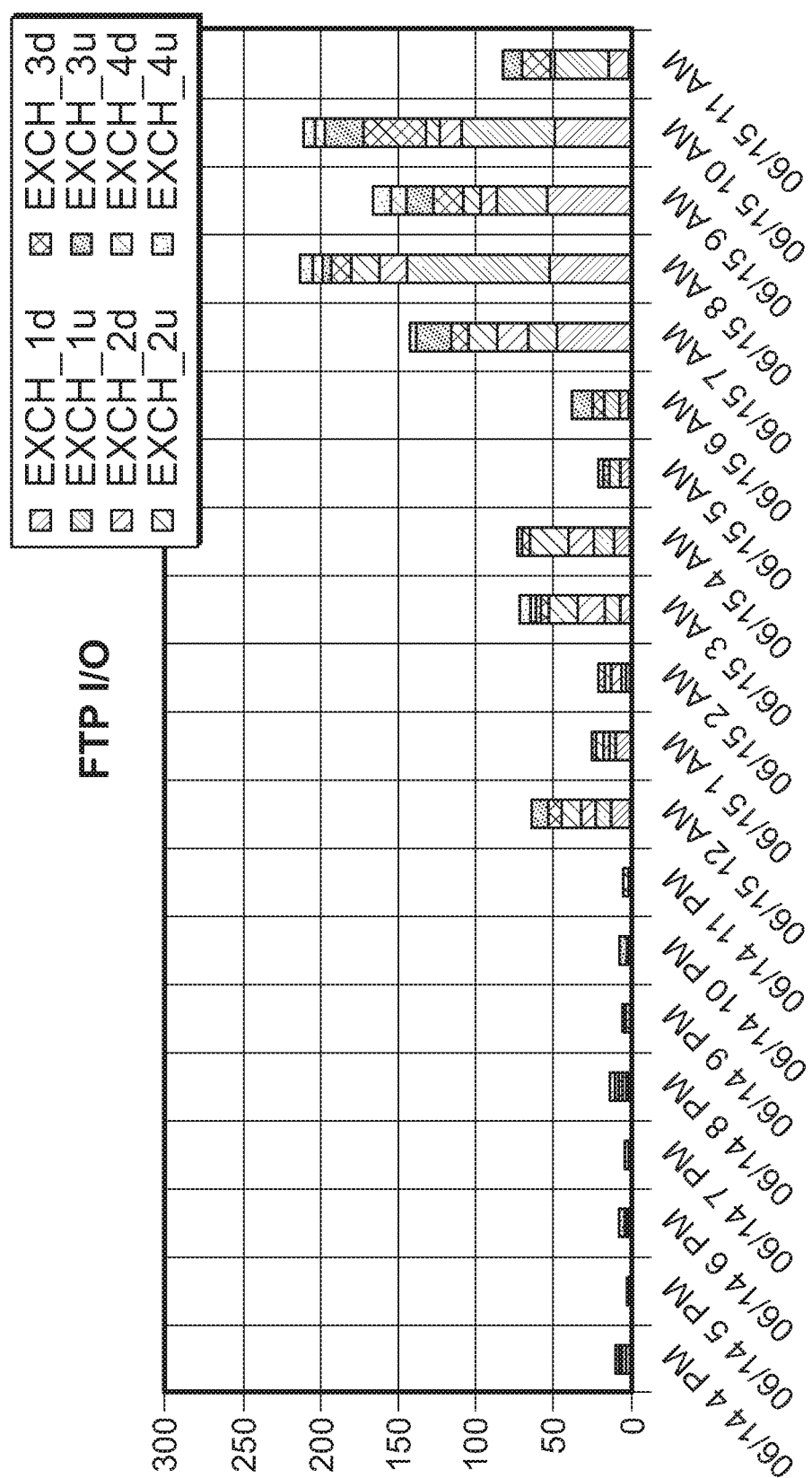
FIG. 13 is a diagram of upload and download activities sampled at various times for a four-instance cluster managed by a cloud operating system according to the invention.

In FIG. 12 (illustrating more detailed activity of Cluster$_2$, $\{\varepsilon_5, \varepsilon_6\}$), notice that downloads (see TPG_EXCH_5d and 6d hatching) occurs first during early morning heavy traffic (e.g. at 5 A.M.). As previously explained, not all clusters 12a-12d have similar traffic patterns. Cluster$_2$ has a lot of European traffic that peaks with a different pattern than normal USA traffic. At 5 A.M. both instances $\varepsilon_5$, $\varepsilon_6$ were downloading their documents. Later, towards 9 A.M., the downloads are completely replaced by uploads after document processing.

Gateway to Cluster$_1$ Transfer Schedule Performance/Error Quantum

Figure 14:
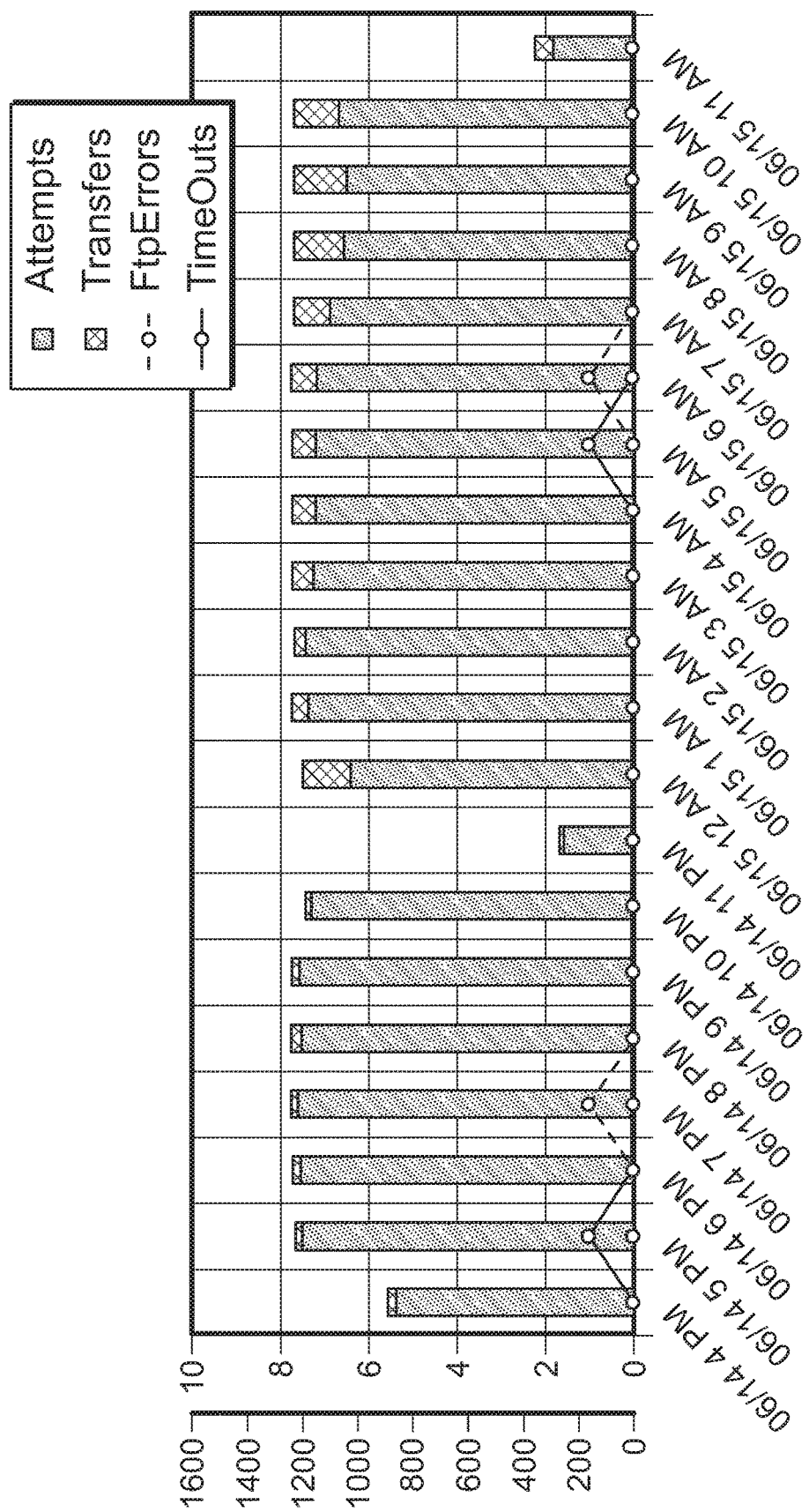
FIG. 14 is a diagram illustrating file transfer protocol (FTP) attempts, completed transfers, errors and timeouts, sampled hourly, of a server cluster running a cloud operating system according to the invention.

A detailed report provided by QRPT is illustrated in FIG. 14. We see that out of thousands of hourly attempts made by multiple instances of Cluster$_1$ {including engines $\varepsilon_1 \ldots \varepsilon_4$}, the two places where MCOS clients reported timeout issues were at 5 P.M. and 5 A.M. From these events, there is a clue of the problem source—it is the FTP service by the DHQ (Drive HQ) provider, which also blinked in close vicinity, hence that could be the reason why a completion message was not passed from the instance to the MCOS server (thereby delaying a timely response). Note that the MCOS server does not blindly kick off an instance after the promised period. It is only when another instance requests to make transfers to the same profile of segments 20 (where a hung-up instance failed to commence its transfer within the promised timeout interval, e.g., because the hung-up instance is "dead" or still attempting to process the file(s) to be transferred) that server component SC marks the non-responsive client "Timed Out".

The web page also allows deeper investigation of scenarios through its searching and filtering capabilities, which limit the display of grid rows (by selecting check boxes and putting the search tokens in text box.)

Queue Clearing Support

Cloud operating system 22, supported by the complementary investigative tooling, helps an EDI system such as network 10 scale up smoothly without proportional stress on administrative resource deployment. In fact, the present inventors have noticed a substantial improvement in support responsiveness despite a several fold increase in transaction volume during cloud migration. The workflow efficiency improved at every level. For example, the "files stuck in queue" were originally detected by reviewing emails. It used to take up to twenty-four hours by two stressed operators/administrators on a daily basis who would analyze every single hourly report to determine whether it had some actionable issue requiring manual action. In contrast, with investigative tooling QRPT of cloud operating system 22, files stuck in queue can be resolved within an hour or so by a single operator/administrator. Even if the operator misses the alert, the dashboard display turning yellow/red catches the attention of other professionals to warn the operator/administrator of the issues if he is distracted by another support call/meeting.

Figure 15:
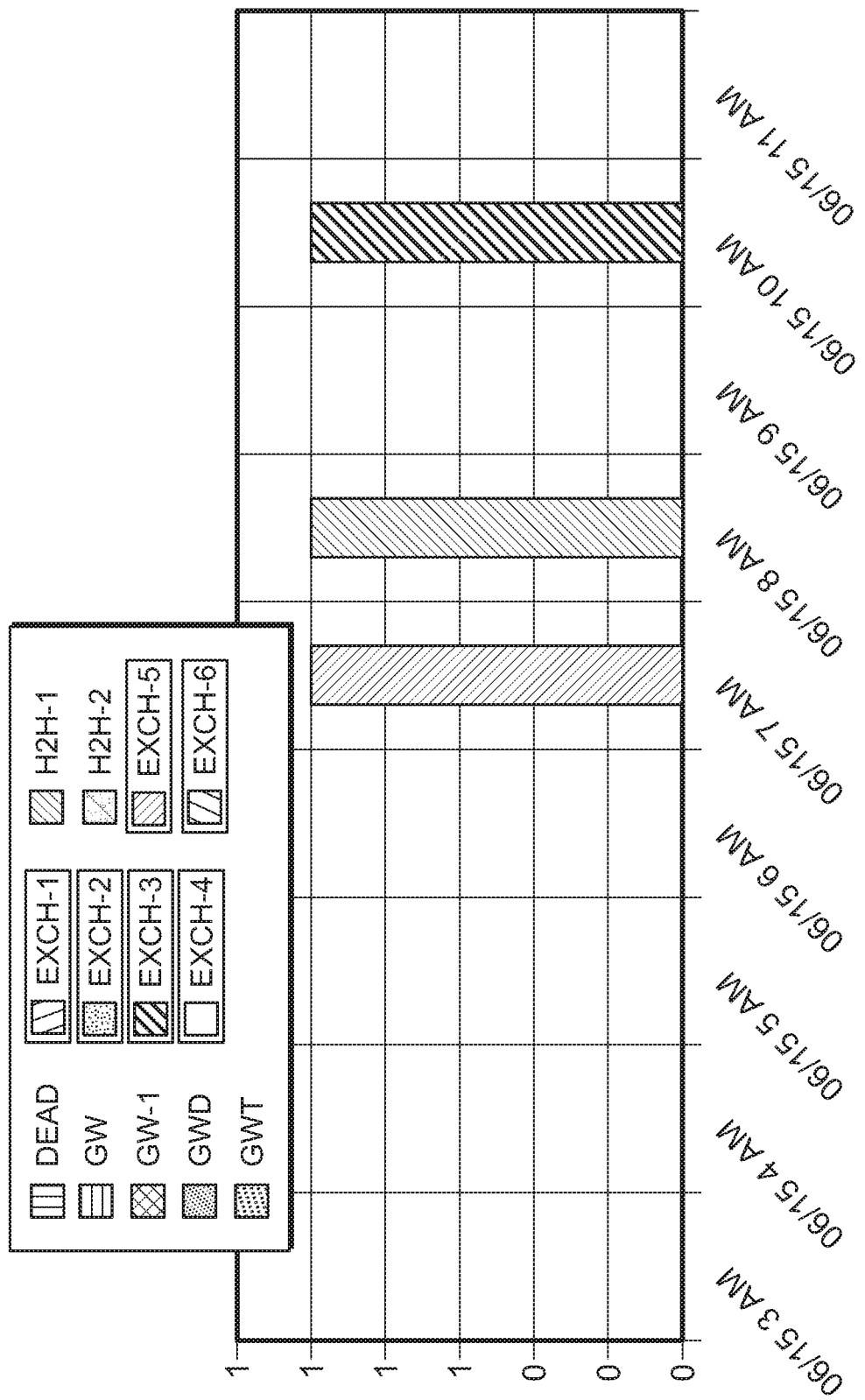
FIG. 15 is a diagram illustrating three incidents of delayed document transfers, all cleared within an hour of occurrence, for a network of 12 servers managed by a cloud operating system according to the invention.

The reduced operator load on the busiest day of the week (typically Monday) is illustrated in FIG. 15. No backlog occurred, and all queues are cleared within an hour or so of occurrence because of real time reporting of potential issues. Note that FIG. 15 reflects the monitoring of twelve server instances of various types, including different kinds of pipeline processors, namely, MegaXML® engine processors, GW processors, and MegaXML® document interchange service real time host-to-host (H2H) server processors, the latter being employed in special circumstances in which a single H2H server would be provisioned to perform the usual functions of a cluster, such as in industries where just-in-time delivery of small orders is the standard, requiring rapid supplier response.

In FIG. 16, distinct attributes of MCOS/cloud operating system 22, providing advantages over existing architectures, are enumerated. It will be noted that the combination of all MCOS agents and corresponding monitoring/control with the latest QRPT SPA portal enables cloud operating system 22 to process more documents with less manual intervention. All instance logs and server activity reports are available through QRPT, which not only provides monitoring through its dashboards, but also enables fully secured/logged corrective action to be taken by an administrator using a mobile device. The need to monitor servers by "RDP-ing" (accessing them through Remote Desktop Protocol) and clicking through logs, thereby endangering server operations/document integrity, has been greatly reduced. Only in rare circumstances would RDP be required. For most recurring use cases, logic is already in place to reduce deterministic friction, impeding flow of documents through business document processing server instances 16a-16d, and the proportional effort needed to manage clusters 12a-12d.

The foregoing description covered architecture, concepts, design, and an overview of the benefits of cloud operating system 22. By way of illustration, examples of programming sequences/physical details are provided below.

Figure 17:
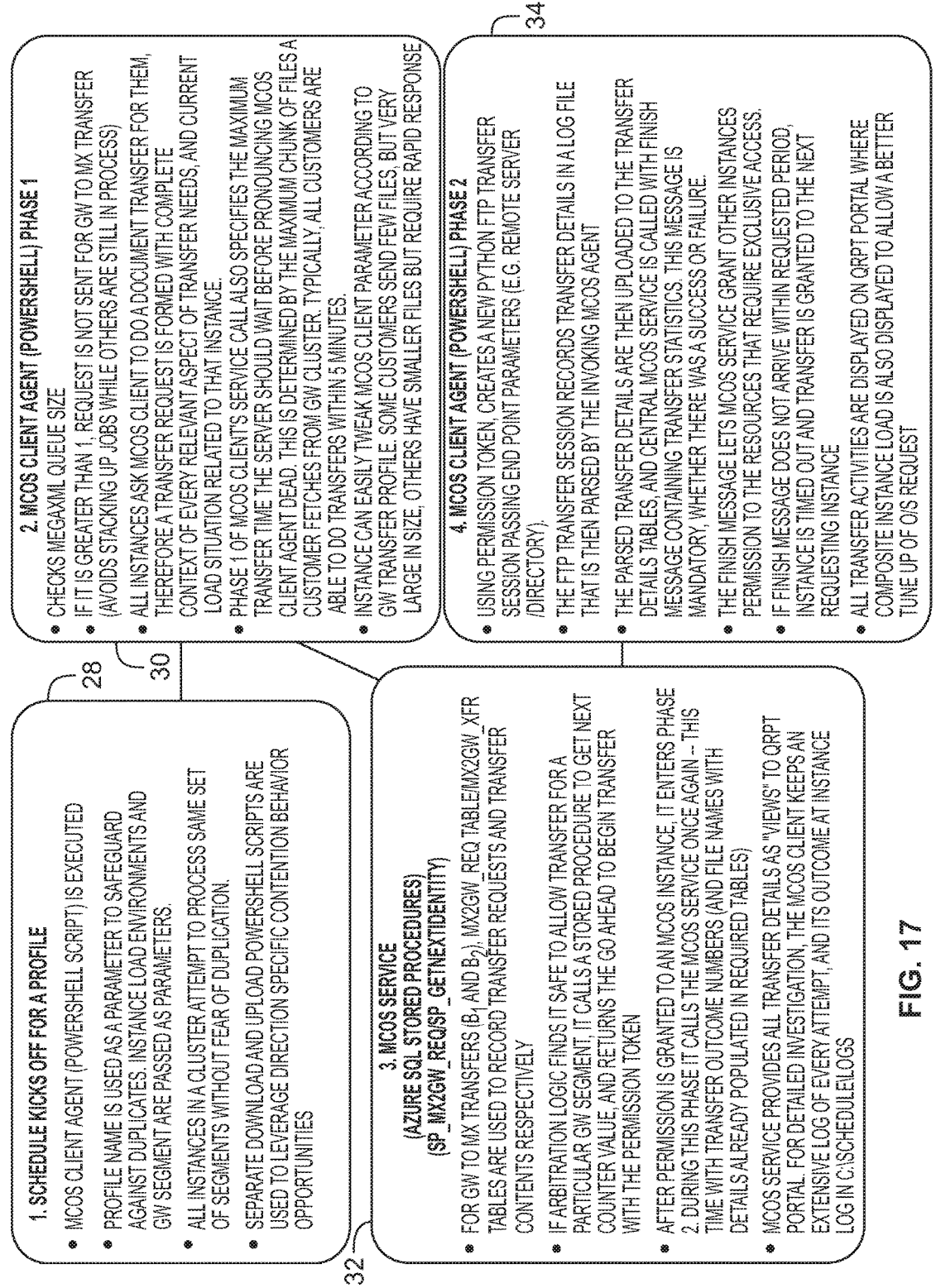
FIG. 17 is a block diagram illustrating a sequence of events through which a cloud operating system of the invention manages a document transfer.

Depicted in FIG. 17 is a block diagram representing the flow of a typical document transfer managed by cloud operating system 22. Interactions between components of cloud operating system 22 and document transfer operations are too dynamic to be comprehensively illustrated in a diagram, and hence a descriptive explanation of a sequence of operations is provided in each block. FIG. 17 is a sequence diagram of a document transfer attempt by an MCOS client agent (i.e., a client component CC) deployed on a document processing server instance. The diagram represents how actions of various phases of the process are distributed between MCOS client and server components in four phases designated 28, 30, 32, 34.

Physical Implementation Examples

Examples of the physical implementation of cloud operating system 22 are now provided, with reference to embedded code samples and graphical user interface screen captures shown in FIGS. 18-22.

1. A sample connection string for MCOS clients provisioned at respective instance engines $\varepsilon_1$-$\varepsilon_4$ of processing server instances 16a-16d to invoke server component SC is as follows:

cz0k2nxrbj.database.windows.net/EDIXML_MegaExch_East_test/tpgAzure1admin@cz0k2nxrbj 2. A typical PowerShell download request (DL-Req) from an MCOS client component CC is as follows:
$testSp1="declare @rc int; exec @rc=sp_Mx2Gw_Req @Request='DL-Req', @Instance='$Instance', @Profile='${Profile}|${PythonConfig}', @TimeOutSec=$TimeOutSec, @Load='$Load', @Time='$Time';"

Figures 18, 19:
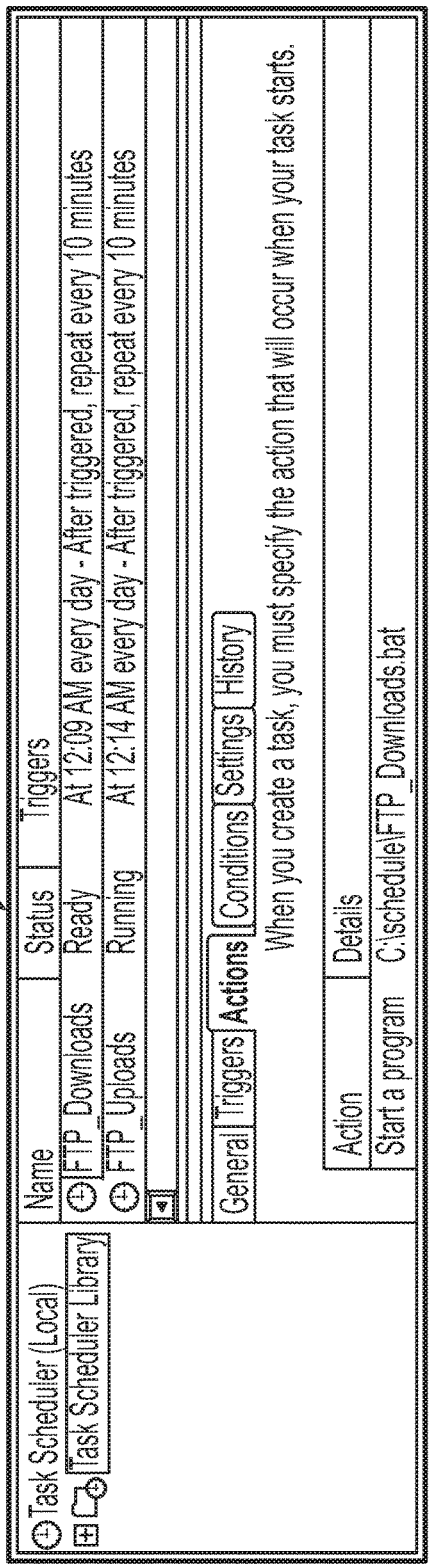
FIG. 18 is a screen capture image of an administrative user interface by which a client agent may be scheduled to initiate a job every 10 minutes from a server instance.
FIG. 19 is a screen capture image of the contents of an illustrative scheduled job invoking PowerShell scripts passing profile parameters for seven endpoint downloads by three MegaXML® document interchange service customers.
Figure 20:
FIG. 20 is a screen capture image of the contents of an illustrative scheduled job invoking PowerShell scripts passing profile parameters for seven endpoint uploads by three MegaXML® document interchange service customers.
Figure 21:
FIG. 21 is a screen capture image of an administrative user interface indicating the provisioning of upload and download agents at one of the instances of a four-instance server cluster managed by a cloud operating system according to the invention.

3. A screen shot 25 of a schedule to kick off a client agent job every 10 minutes from a processing server instance 16a-16d, as viewed by an administrator of cloud operating system 22, is shown in FIG. 18.

4. A screen shot 27 displaying contents of a scheduled job invoking a PowerShell script to pass profile parameters for seven endpoint downloads by three clients is shown in FIG. 19.

5. A typical PowerShell upload request from a client agent is as follows:
$testSp1="declare @rc int; exec @rc=sp_Mx2Gw_Req @Request='DL-Req', @Instance='$Instance', @Profile='${Profile}|${PythonConfig}', @TimeOutSec=$TimeOutSec, @Load='$Load', @Time='$Time';"

6. Contents of a scheduled job invoking a PowerShell script to pass profile parameters for seven endpoint uploads by three clients are shown in a screen shot 29 depicted in FIG. 20.

7. The provisioning of upload and download agents of cloud operating system 22 at one of the instances on a cluster with four members is indicated in the user interface table shown in a screen shot 31 depicted in FIG. 21.

8. An identity counter table 33 used for supplying permission ID values is shown in a screen shot 33 depicted in FIG. 22. Counter table 33 is a one-value table that contains a unique permission ID and increments with each query. Counter table 33 is locked to ensure that no two requests are assigned the same permission ID.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A cloud operating system to be run by a plurality of machines including a server cluster and an external computer system, the server cluster comprising a gateway computer system having a gateway storage volume and a plurality of processing server instances, to facilitate electronic data interchange among a plurality of provisioned entities interacting with the server cluster through the gateway computer system, the cloud operating system comprising programmed instructions stored in a non-transitory storage medium readable by the external computer system, gateway computer system, and processing server instances, the programmed instructions including:

instructions for one of the processing server instances to send a service call to a server component residing in the external computer system, the service call comprising a request for the processing server instance to access the gateway storage volume to transfer at least one file to or from the gateway storage volume;

instructions for the server component to apply permission logic for granting or deferring the request, including applying at least a rule to defer the request if the requested file transfer would conflict with a file transfer to or from another processing server instance, and to grant or defer the request in accordance with the permission logic;

dynamic access granting instructions for the server component to dynamically grant access to the requesting processing server instance when the request is granted, the dynamic access granting instructions configured to provide any requesting processing server instance equal access to the gateway storage volume; and instructions for the processing server instance to create a transfer session with the gateway computer system for the requested file transfer to be executed when the server component grants the request.

2. The cloud operating system of claim 1, the programmed instructions further including instructions for the processing server instance, upon completing said requested file transfer, to transmit a completion signal to the server component.

3. The cloud operating system of claim 2, the permission logic including a rule to defer a subsequent request that would conflict with a previously granted request when, at the time of the subsequent request, the server component has not received a completion signal corresponding to the previously granted request.

4. The cloud operating system of claim 1, the programmed instructions further including instructions for each processing server instance to initiate file transfer activity at a file transfer activity start time assigned to the respective processing server instance, the file transfer activity including the respective processing server instance sending said service call to the server component.

5. The cloud operating system of claim 4, the file transfer activity start times of all the processing server instances occurring in a predefined, repeating sequential order.

6. The cloud operating system of claim 4, the file transfer activity start times being separated by a fixed time interval.

7. The cloud operating system of claim 1, said dynamic access granting instructions configured for the gateway computer system to provide any requesting processing server instance access to an entire available space of the gateway storage volume.

8. The cloud operating system of claim 1, said dynamic access granting instructions configured to provision an entire available space of the gateway storage volume in orthogonal scheduled time intervals to each processing server instance, and in the event that operations of a particular processing server instance continue past its respective time interval into an overlapping time subinterval comprising a portion of a subsequent time interval provisioned to another processing server instance, the dynamic access granting instructions configured to apportion the storage volume in the overlapping time subinterval into orthogonal space-time segments assigned separately to operations of each overlapping processing server instance to reduce the probability of a collision.

9. The cloud operating system of claim 1, the programmed instructions further comprising instructions for the server component to, after receiving the file transfer request, record at least one context variable passed as an argument to the transfer request in a data table associated with a current counter value; and instructions for the server component, after determining that conditions for granting the request are satisfied, to call a stored procedure to assign a new current counter value to the data table.

10. The cloud operating system of claim 1, the programmed instructions further comprising instructions for the server component to, if the requested file transfer would collide in the gateway storage volume with a prior requested file transfer from another processing server instance, host an environment in which the conflicting file transfers are handled one at a time.

11. The cloud operating system of claim 1, the programmed instructions further comprising instructions for the transfer request from the requesting processing server instance to include priority information for the request.

12. The cloud operating system of claim 1, the programmed instructions further comprising instructions for the transfer request from the requesting processing server instance to include information specifying a current state of the requesting processing server instance.

13. The cloud operating system of claim 1, the programmed instructions further comprising instructions for the transfer request from the requesting processing server instance to specify a maximum pre-transfer timeout time after which the requested transfer, if granted and not yet initiated, will be terminated.

14. The cloud operating system of claim 1, further comprising a gateway service to be hosted by the gateway computer system of each cluster, the gateway service having two logical ends, including a customer end through which system customers interact with the cluster and a trading partner end through which trading partners of the system customers interact with the cluster, further comprising a specialized client component configured to reside in each processing server instance for processing file transfers to and from system customers operating legacy enterprise resource planning systems that require a plurality of files received from a trading partner to be converted to a single concatenated byte stream.

15. A method of performing electronic data interchange among a plurality of provisioned entities using a cloud operating system to be run by a plurality of machines including an external computer system and a server cluster, the server cluster comprising a gateway computer system having a gateway storage volume and a plurality of processing server instances, to facilitate electronic data interchange among a plurality of provisioned entities interacting with the server cluster through the gateway computer system, comprising programmed instructions stored in a storage medium readable by the external computer system, gateway computer system, and processing server instances, the instructions including instructions for one of the processing server instances to send a service call to a server component residing in the external computer system, the service call comprising a request for the processing server instance to access the gateway storage volume to transfer at least one file to or from the gateway storage volume; instructions for the server component to apply permission logic to the file transfer request, the permission logic specifying rules for granting or deferring the request, including at least a rule to defer the request if the requested file transfer would conflict with a file transfer to or from another processing server instance, and to grant or defer the request in accordance with the permission logic; if the request is granted, instructions for the server component to dynamically grant access to the requesting processing server instance, the dynamic access granting instructions configured to provide any requesting processing server instance equal access to the gateway storage volume; and instructions for the processing server instance, if the server component grants the request, to create a transfer session with the gateway computer system for the requested file transfer to be executed; the method comprising:

the gateway computer system receiving a file transfer comprising a document from a sending one of said provisioned entities and storing the document in the gateway storage volume;

one of the processing server instances sending a service call to the server component comprising a request for the processing server instance to access the gateway storage volume to transfer the document from the gateway storage volume;

the server component applying said permission logic to the request to transfer the document from the gateway storage volume and granting the request based on said permission logic;

the server component dynamically granting said one of the processing server instances said equal access to the gateway storage volume to transfer the document from the gateway storage volume;

said one of the processing server instances creating a transfer session with the gateway computer system for executing the requested transfer of the document from the gateway storage volume;

the requested transfer of the document from the gateway storage volume being executed;

said one of the processing server instances converting the document into a format for sending to a receiving one of said provisioned entities;

said one of the processing server instances sending a service call to the server component comprising a request for the processing server instance to access the gateway storage volume to transfer the converted document to the gateway storage volume;

the server component applying said permission logic to the request to transfer the converted document to the gateway and granting the request based on said permission logic;

the server component dynamically granting said one of the processing server instances said equal access to the gateway storage volume to transfer the converted document to the gateway storage volume;

said one of the processing server instances creating a transfer session with the gateway computer system for executing the requested transfer of the converted document to the gateway storage volume;

the requested transfer of the converted document to the gateway storage volume being executed; and the gateway sending the converted document to said receiving one of said provisioned entities.

16. The method of claim 15, said dynamic access granting instructions configured to provision an entire available space of the gateway storage volume in orthogonal scheduled time intervals of a recurring clock cycle to each processing server instance, and in the event that operations of a particular processing server instance continue past its respective time interval into an overlapping time subinterval comprising a portion of a subsequent time interval provisioned to another processing server instance, apportioning the storage volume in the overlapping time subinterval into orthogonal space-time segments assigned separately to operations of each overlapping processing server instance to reduce the probability of a collision.

17. The method of claim 15, said cloud operating system further comprising instructions for the server component to, after receiving the file transfer request, record at least one context variable passed as an argument to the transfer request in a data table associated with a current counter value; and instructions for the server component, after determining that conditions for granting the request are satisfied, to call a stored procedure to assign a new current counter value to the data table, and the method further comprising the server component executing said instructions to record the transfer request context variable and assign a new counter value.

18. The method of claim 15, said cloud operating system further comprising instructions for the server component to, if the requested file transfer would collide in the gateway storage volume with a prior requested file transfer from another processing server instance, host an environment in which the conflicting file transfers are handled one at a time, and the method further comprising in the event that a requested file transfer would collide in the storage volume with a prior requested file transfer from another processing server instance, the server component executing said instructions to host said environment, and said conflicting file transfers being handled one at a time in said environment.

19. The method of claim 11, the cloud operating system further comprising a gateway service to be hosted by the gateway computer system of each cluster, the gateway service having two logical ends, including a customer end through which system customers interact with the cluster and a trading partner end through which trading partners of the system customers interact with the cluster, further comprising a specialized client component residing in each processing server instance for processing file transfers to and from system customers operating legacy enterprise resource planning systems that require a plurality of files transferred through the trading partner end to be converted to or from a single concatenated byte stream, and the method further comprising the gateway computer system hosting said gateway service;

each processing server instance hosting said specialized client component; and said converting the document comprising converting the document to or from a single concatenated byte stream.

20. A computer system for performing electronic data interchange among a plurality of provisioned entities using a cloud operating system to be run by a plurality of machines including an external computer system and a server cluster, the server cluster comprising a gateway computer system having a gateway storage volume and a plurality of processing server instances, to facilitate electronic data interchange among a plurality of provisioned entities interacting with the server cluster through the gateway computer system, comprising programmed instructions stored in a non-transitory storage medium readable by the external computer system, gateway computer system, and processing server instances, the instructions including instructions for one of the processing server instances to send a service call to a server component residing in the external computer system, the service call comprising a request for the processing server instance to access the gateway storage volume to transfer at least one file to or from the gateway storage volume; instructions for the server component to apply permission logic to the file transfer request, the permission logic specifying rules for granting or deferring the request, including at least a rule to defer the request if the requested file transfer would conflict with a file transfer to or from another processing server instance, and to grant or defer the request in accordance with the permission logic; if the request is granted, instructions for the server component to dynamically grant access to the requesting processing server instance, the dynamic access granting instructions configured to provide any requesting processing server instance equal access to the gateway storage volume; and instructions for the processing server instance, if the server component grants the request, to create a transfer session with the gateway computer system for the requested file transfer to be executed; the system comprising:

said external computer system hosting said server component; and
said server cluster comprising said gateway computer system having the gateway storage volume and said plurality of processing server instances;
the gateway storage volume provisioned to send and receive file transfers from each of said provisioned entities.

21. The system of claim 20, said dynamic access granting instructions configured to provision an entire available space of the gateway storage volume in orthogonal scheduled time intervals of a recurring clock cycle to each processing server instance, and in the event that operations of a particular processing server instance continue past its respective time interval into an overlapping time subinterval comprising a portion of a subsequent time interval provisioned to another processing server instance, apportioning the storage volume in the overlapping time subinterval into orthogonal space-time segments assigned separately to operations of each overlapping processing server instance to reduce the probability of a collision.

22. The system of claim 20, said cloud operating system further comprising instructions for the server component to, after receiving the file transfer request, record at least one context variable passed as an argument to the transfer request in a data table associated with a current counter value; and instructions for the server component, after determining that conditions for granting the request are satisfied, to call a stored procedure to assign a new current counter value to the data table.

23. The system of claim 20, said cloud operating system further comprising instructions for the server component to, if the requested file transfer would collide in the gateway storage volume with a prior requested file transfer from another processing server instance, host an environment in which the conflicting file transfers are handled one at a time.

24. The system of claim 20, the cloud operating system further comprising a gateway service hosted by the gateway computer system of each cluster, the gateway service having two logical ends, including a customer end through which system customers interact with the cluster and a trading partner end through which trading partners of the system customers interact with the cluster, further comprising a specialized client component residing in each processing server instance for processing file transfers to and from system customers operating legacy enterprise resource planning systems that require a plurality of files transferred through the trading partner end to be converted to or from a single concatenated byte stream.

* * * * *